(12) United States Patent
Zhou et al.

(10) Patent No.: US 11,120,582 B2
(45) Date of Patent: Sep. 14, 2021

(54) UNIFIED DUAL-DOMAIN NETWORK FOR MEDICAL IMAGE FORMATION, RECOVERY, AND ANALYSIS

(71) Applicant: Z2Sky Technologies Inc., Suzhou (CN)

(72) Inventors: Shaohua Kevin Zhou, Princeton, NJ (US); Haofu Liao, Rochester, NY (US); Wei-An Lin, Greenbelt, MD (US)

(73) Assignee: Z2SKY TECHNOLOGIES INC., Suzhou (CN)

( * ) Notice: Subject to any disclaimer, the term of this patent is extended or adjusted under 35 U.S.C. 154(b) by 76 days.

(21) Appl. No.: 16/527,331

(22) Filed: Jul. 31, 2019

(65) Prior Publication Data

US 2021/0035338 A1 Feb. 4, 2021

(51) Int. Cl.
| | |
|---|---|
| *G06T 11/00* | (2006.01) |
| *G06T 3/40* | (2006.01) |
| *G06T 5/00* | (2006.01) |
| *G06N 3/04* | (2006.01) |
| *G06N 20/20* | (2019.01) |
| *G06N 3/08* | (2006.01) |

(52) U.S. Cl.
CPC .......... *G06T 11/006* (2013.01); *G06N 3/0454* (2013.01); *G06N 3/084* (2013.01); *G06N 20/20* (2019.01); *G06T 3/4007* (2013.01); *G06T 5/001* (2013.01); *G06T 2210/41* (2013.01)

(58) Field of Classification Search
CPC ..... G06T 11/006; G06T 3/4007; G06T 5/001; G06T 2210/41; G06N 20/20; G06N 3/0454; G06N 3/084
See application file for complete search history.

(56) References Cited

U.S. PATENT DOCUMENTS

| | | | | |
|---|---|---|---|---|
| 2019/0108904 | A1* | 4/2019 | Zhou | G06K 9/66 |
| 2019/0114462 | A1* | 4/2019 | Jang | G06K 9/3233 |
| 2019/0332939 | A1* | 10/2019 | Alletto | H04N 19/18 |
| 2020/0027252 | A1* | 1/2020 | Ye | G01N 23/10 |
| 2020/0167975 | A1* | 5/2020 | Popescu | G06T 11/60 |
| 2021/0012541 | A1* | 1/2021 | Lee | G06T 11/006 |
| 2021/0012543 | A1* | 1/2021 | Hein | G06T 7/0012 |

* cited by examiner

*Primary Examiner* — Khai M Nguyen
(74) *Attorney, Agent, or Firm* — Hard IP LLC

(57) ABSTRACT

An apparatus and method for coupled medical image formation and medical image signal recovery using a dual domain network is disclosed. The dual-domain network includes a first deep neural network (DNN) to perform signal recovery in a sensor signal domain and a second DNN to perform signal recovery in an image domain. A sensor signal is acquired by a sensor of a medical imaging device. A refined sensor signal is generated from the received sensor signal using the first DNN. A first reconstructed medical image is generated from the received sensor signal. A second reconstructed medical image is generated from the refined sensor signal generated by the first DNN. An enhanced medical image is generated based on the both the first reconstructed medical image and the second reconstructed medical image using the second DNN. The enhanced medical image generated by the second DNN is displayed.

14 Claims, 19 Drawing Sheets

Without RC loss
1602

With RC loss
1604

Ground Truth
1606

Without MP
1702

With MP
1704

Ground Truth
1706

PSNR: 5-6dB better than linear interpolation

UNIFIED DUAL-DOMAIN NETWORK FOR MEDICAL IMAGE FORMATION, RECOVERY, AND ANALYSIS

BACKGROUND OF THE INVENTION

The present invention relates to medical image formation, recovery, and analysis using deep learning networks, and more particularly to a unified dual-domain network for medical image formation, recovery, and analysis.

Medical imaging is used for creating visual representations of the internal anatomy of humans and is an essential tool for medical diagnosis and intervention. Many different medical imaging modalities are commonly used, including computed tomography (CT), magnetic resonance imaging (MRI), X-ray, ultrasound, positron emission tomography (PET), etc.

Medical images are typically formed by scanning a subject (e.g., human body) with a scanner or sensor of a medical image acquisition device (e.g., CT scanner, MRI scanner, etc.) to acquire sensor data, and then applying a reconstruction of transformation algorithm to the sensor data to generate the medical images, Computer-, based medical image analysis algorithms are typically applied to such medical images to assist users, such as physicians or radiologists, in using the medical images effectively for various purposes, such as disease diagnosis, intervention guidance, etc. For example, image analysis algorithms can be applied for signal recovery (e.g., de-noising, de-blurring, artifact removal, super resolution, etc.) to improve the visual quality of the medical images. This allows helps doctors to more accuracy interpret the medical images for diagnosis and treatment.

While many techniques have been developed for medical image analysis, improvements in accuracy, efficiency, and speed of medical image analysis are highly desirable in order to provide improved diagnosis and treatment results.

BRIEF SUMMARY OF THE INVENTION

The present invention provides apparatuses and methods for medical image formation, recovery, and analysis using deep learning networks. An embodiment of the present invention provides a unified dual-domain network for medical image formation and analysis. The unified dual-domain network includes deep neural networks (DNNs) that enhance medical image data in the pre-transformation signal domain and the post-transformation image domain and a differentiable transformation/reconstruction layer that allows the DNNs to be trained together end-to-end. Another embodiment of the present invention provides an "H-net" image-to-image DNN that takes into account multiscale and contextual features more effectively than existing DNNs. The H-net can be utilized independently or as part of the unified dual-domain network.

In an embodiment of the present invention, a method for coupled medical image formation and medical image signal recovery using a dual-domain network having a first deep neural network (DNN) to perform signal recovery in a sensor signal domain and a second DNN to perform signal recovery in an image domain, comprises: receiving a sensor signal acquired by a sensor of a medical imaging device; generating a refined sensor signal from the received sensor signal using the first DNN; generating a first reconstructed medical image from the received sensor signal; generating a second reconstructed medical image from the refined sensor signal generated by the first DNN; generating an enhanced medical image based on the both the first reconstructed medical image and the second reconstructed medical image using the second DNN: and displaying the enhanced medical image generated by the second DNN.

In an embodiment, the first and second DNNs of the dual-domain network are trained together end-to-end based on training data to minimize a combined loss function.

In an embodiment, generating a first reconstructed medical image from the received sensor signal comprises reconstructing the first reconstructed medical image from the received sensor signal using a differentiable reconstruction layer of the dual-domain network; and generating a second reconstructed medical image from the refined sensor signal generated by the first DNN comprises reconstructing the second reconstructed medical image from the refined sensor signal using the differentiable reconstruction layer of the dual-domain network, wherein the differentiable reconstruction layer of the dual-domain network allows back propagation of gradients from the second DNN to the first DNN during training.

In an embodiment, the received sensor signal and refined sensor signals are fan-beam sinograms, the first and second reconstructed medical images are computed tomography images, and the differentiable reconstruction layer comprises a radon inversion layer that reconstructs a CT image from a fan-beam sinogram by: converting the fan-beam sinogram to a parallel-beam sinogram; applying Ram-Lak filtering to the parallel-beam sinogram; and back-projecting the filtered parallel-beam sinogram to the image domain for each of a plurality of projection angles.

In an embodiment, the first and second DNNs are trained to perform computed tomography (CT) metal artifact reduction, the received sensor signal is a sinogram received from a CT scanner, and the method further comprises: generating a metal trace mask from the received sinogram; and performing linear interpolation on the received sinogram, resulting a linearly interpolated sinogram.

In an embodiment, generating a refined sensor signal from the received sensor signal using the first DNN comprises generating a restored sinogram from the linearly interpolated sinogram and the metal trace mask using the first DNN; generating a first reconstructed medical image from the received sensor signal comprises reconstructing a first reconstructed CT image from the linearly interpolated sinogram using a differentiable radon inversion layer of the dual-domain network; generating a second reconstructed medical image from the refined sensor signal generated by the first DNN comprises reconstructing a second reconstructed CT image from the restored sinogram using the differentiable radon inversion layer of the dual-domain network; and generating an enhanced medical image based on the both the first reconstructed medical image and the second reconstructed medical image using the second DNN comprises generating a reduced metal artifact CT image based on the first reconstructed CT image and the second reconstructed CT image using the second DNN.

In an embodiment, the first DNN has a mask pyramid U-Net architecture.

In an embodiment, the first and second DNNs of the dual-domain network are trained together end-to-end based on training data to minimize a combined loss function that includes a first DNN loss, a second DNN loss, and a radon consistency loss that penalizes restored sinograms generated by the first DNN that lead to secondary artifacts in the image domain after reconstruction by the radon inversion layer.

In an embodiment, the first and second DNNs are deep image-to-image networks.

In an embodiment, at least one of the first DNN or the second DNN is an H-net deep image-to-image network comprising: a first deep image-to-image network trained to generate an enhanced output image from an input image; and a second deep image-to-image network trained to generate a coarse resolution enhanced output image from a coarse resolution input image generated by down-sampling the input image, wherein a plurality of encoding stages of the first image-to-image network each input feature maps generated by a preceding encoding stage of the first image-to-image network and feature maps generated by the preceding encoding stage of the second image-to-image network, and generate feature maps based on the input feature maps from the preceding stage of the first deep image-to-image network and the preceding stage of the second deep image-to-image network.

In an embodiment, the first and second DNNs are trained to perform at least one of computed tomography (CT)/cone beam computed tomography (CBCT) sparse view reconstruction, full phase magnetic resonance (MR) image recovery from a reduced phase MR acquisition, mufti-channel MR image recover from an MR acquisition with fewer channels, 3D MR slice interpolation, or X-ray image denoising.

In an embodiment of the present invention an apparatus for coupled medical image formation and medical image signal recovery comprises: a medical image acquisition device sensor to acquire a sensor signal representing anatomy of a subject; a processor; and a memory storing computer program instructions for coupled medical image formation and medical image signal recovery using a dual-domain network having a first deep neural network (DNN) to perform signal recovery in a sensor signal domain and a second DNN to perform signal recovery in an image domain. The computer program instructions when executed by the processor cause the processor to perform operations comprising: generating a refined sensor signal from the received sensor signal using the first DNN; generating a first reconstructed medical image from the received sensor signal; generating a second reconstructed medical image from the refined sensor signal generated by the first DNN; generating an enhanced medical image based on the both the first reconstructed medical image and the second reconstructed medical image using the second DNN; and displaying the enhanced medical image generated by the second DNN.

In an embodiment of the present invention, a non-transitory computer readable medium stores computer program instructions for coupled medical image formation and medical image signal recovery using a dual-domain network having a first deep neural network (DNN) to perform signal recovery in a sensor signal domain and a second DNN to perform signal recovery in an image domain. The computer program instructions when executed by a processor cause the processor to perform operations comprising: receiving a sensor signal acquired by a sensor of a medical imaging device; generating a refined sensor signal from the received sensor signal using the first DNN; generating a first reconstructed medical image from the received sensor signal; generating a second reconstructed medical image from the refined sensor signal generated by the first DNN; generating an enhanced medical image based on the both the first reconstructed medical image and the second reconstructed medical image using the second DNN; and displaying the enhanced medical image generated by the second DNN.

These and other advantages of the invention will be apparent to those of ordinary skill in the art by reference to the following detailed description and the accompanying drawings.

DETAILED DESCRIPTION

The present invention relates to apparatuses and methods for medical image formation, recovery, and analysis using deep learning networks.

Embodiments of the present invention provide multiple advances to conventional techniques for medical image formation, recovery, and analysis that provide improved accuracy and efficiency. An embodiment the present invention provides a unified dual-domain network for medical image formation and analysis. The unified dual-domain network includes deep neural networks (DNNs) that enhance medical image data in the pre-transformation signal domain and the post-transformation image domain and a differentiable transformation/reconstruction layer that allows the DNNs to be trained together end-to-end. Another embodiment of the present invention provides an "H-net" image-to-image DNN that takes into account multiscale and contextual features more effectively than existing DNNs. The H-net can be utilized independently or as part of the unified dual-domain network.

Figure 1:
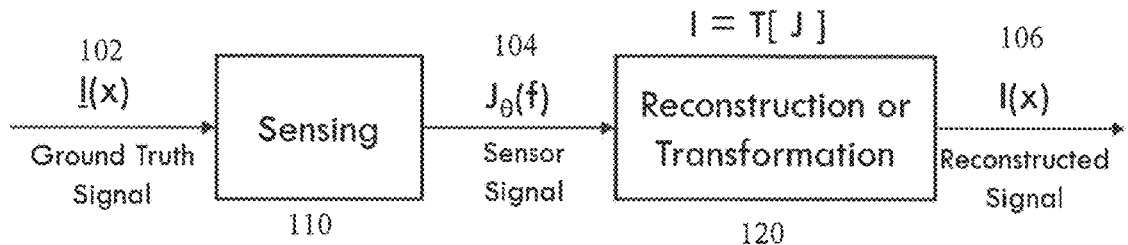
FIG. 1 illustrates an exemplary medical image formation process.

FIG. 1 illustrates an exemplary medical image formation process. As shown in FIG. 1, the medical image formation process includes sensing 110 and transformation 120. During sensing 110, a ground truth signal $\underline{I}(x)$ 102 is scanned by a sensing device to generate a sensor signal $J_\theta(f)$ 104. The ground truth signal $\underline{I}(x)$ 102 is the subject being imaged, i.e., the actual anatomy of the patient in the case of medical imaging. The sensing device is a sensor or scanner of a medical image acquisition device, such as a computed tomography (CT) scanner, magnetic resonance imaging (MRI) scanner, Ultrasound device, X-ray device, positron emission tomography (PET) scanner, etc. The sensor signal $J_\theta(f)$ 104 is the signal generated by the sensor of the medical image acquisition device to represent the ground truth signal $\underline{I}(x)$ 102, where $\theta$ represents the sensing parameters of the sensor. During transformation 120, the sensor signal $J_\theta(f)$ 104 is transformed or reconstructed by a transformation T to generate a reconstructed signal I(x) 106, i.e., I=T[J]. Depending on the type of medical image being generated the transformation can be reconstruction, in which 2D or 3D images are generated from a set of 1D projections. The reconstruction or transformation 120 is a computer-based transformation applied to the sensor signal $J_\theta(f)$ 104 in order to generate the reconstructed signal I(x) 106. The reconstruction or transformation 120 is typically performed by a processor (e.g., GPU) of the medical image acquisition device. The reconstructed signal I(x) 106 is a 2D or 3D medical image (e.g., CT image, MR image, etc.) that can be displayed on a display device, printed, and/or analyzed manual, automated, or semi-automated medical image analysis techniques. In CT or PET image formation, the sensor signal $J_\theta(f)$ 104 is a sinogram and the transformation T is Fourier slice reconstruction. In MRI image formation, the transformation T is fast Fourier transform (FFT). In charged-coupled device (CCD) image formation, T is an identity matrix. In compressed sensing (CS) image formation, J is a set of samples and T is CS reconstruction. In JPEG image formation, T can be a discrete cosine transform (DCT) or a wavelet transform.

Figure 2:
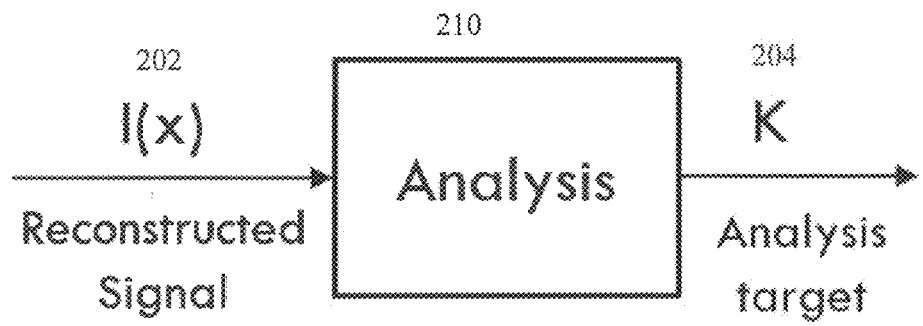
FIG. 2 illustrates an exemplary medical image analysis process.

FIG. 2 illustrates an exemplary medical image analysis process. As shown in FIG. 2, after a reconstructed signal I(x) 202 (e.g., CT image, MRI image, etc.) is generated by the medical image formation process of FIG. 1, analysis 210 is performed on the reconstructed signal 202 and an analysis target K 204 is output. The analysis 210 is performed using one or more computer-based medical image analysis algorithms, which may be implemented on the medical image acquisition device used to acquire the reconstructed medical image 202 using one or more processors (e.g., GPU) of the medical image acquisition device, on another computer, or on a cloud-based computing system. Various medical image analysis algorithms may be applied to the reconstructed image 202. For example, various signal recovery algorithms may be applied to try to generate a recovered signal (enhanced medical image) that more accurately represents the ground truth signal (anatomy of the subject being imaged), Examples of signal recovery algorithms include, but are not limited to, denoising, super-resolution, inpainting, deblurring, etc. The analysis target K 204 in a signal recovery task is typically a medical image that provides the result of the medical image analysis 210 performed on the reconstructed image I(x) 202. For example, the analysis target K 204 can be an enhanced medical image resulting from one or more signal recovery algorithms, or a medical image showing results of other types of medical image analysis algorithms. The analysis target K 204 can be output by being displayed on a display of the medical image acquisition device or another computer system. The analysis 210 may include other types of medical image analysis algorithms as well, such as segmentation algorithms, registration algorithms, anatomy and/or disease detection algorithms, motion tracking algorithms, etc.

Figure 3:
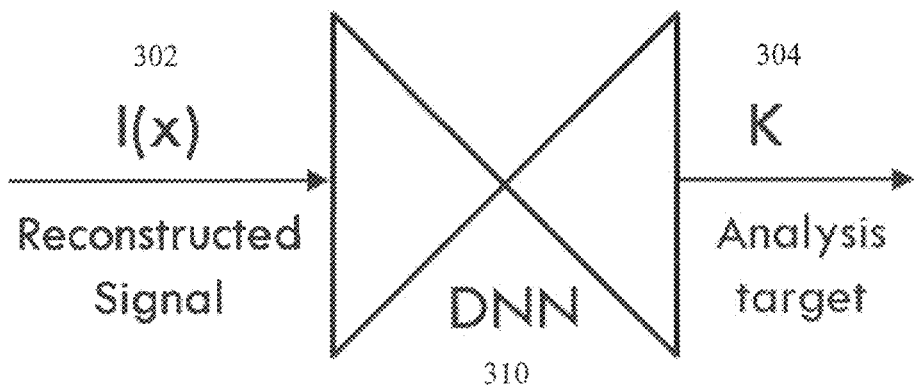
FIG. 3 illustrates an exemplary process for medical image analysis using a deep neural network (DNN)

In recent years deep learning has been applied to various medical image analysis tasks. FIG. 3 illustrates an exemplary process for medical image analysis using a deep neural network (DNN). As shown in FIG. 3, a reconstructed signal I(x) 302 generated by the medical image formation process of FIG. 1 is input to a trained DNN 310, and the trained DNN 310 outputs the analysis target K 304, Deep neural networks are machine learning based neural networks with multiple hidden layers of learned features or variables between the input data and the output data. The DNN 310 is trained to perform a specific medical image analysis task in a training stage based on training data. The DNN 310 may be a deep image-to-image neural network that inputs an image (reconstructed signal I(x) 302) and outputs an image (analysis target K 304). Other types of DNNs may also be used based on the medical image analysis task being performed.

Figure 4:
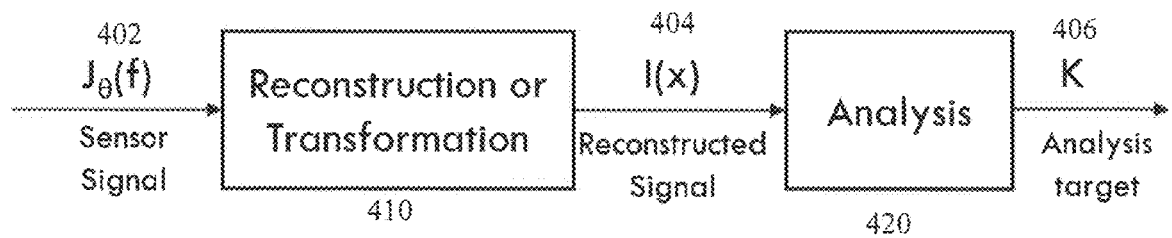
FIG. 4 illustrates an exemplary process in which the signal transformation and medical image analysis is coupled.

According to an advantageous embodiment of the present invention, medical image analysis can be improved by coupling the signal transformation and medical image analysis. FIG. 4 illustrates an exemplar), process in which the signal transformation and medical image analysis is coupled. As shown in FIG. 4, reconstruction or transformation 410 is performed on a sensor signal $J_\theta(f)$ 402 generated by a sensor device of a medical image acquisition device in order to generate a reconstructed signal I(x) 404. Analysis 420 is performed on the reconstructed signal I(x) by one or more medical image analysis algorithms and an analysis target K 406 is output. In the method of FIG. 4, the reconstruction/transformation and analysis operations 410 and 420 can be performed automatically when the sensor signal $J_\theta(f)$ 402 is acquired, such that the analysis target K 406 is automatically output (e.g., displayed) without first displaying the reconstructed signal I(x) 404.

Figure 5:
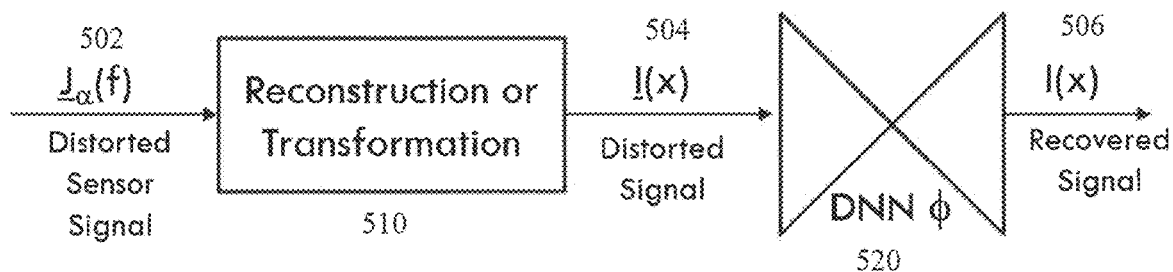
FIG. 5 illustrates a first framework for deep learning based medical image formation and signal recovery.

An important type of medical image analysis is signal recovery. Acquiring medical images often results in distortion of the actual anatomy of the subject being imaged. For example, the medical images may have artifacts caused by noise, metal objects, patient motion, etc, Signal recovery attempts to rectify such by processing the distorted signal to generate a recovered signal that more accurately represents the ground truth signal. Examples of signal recovery algorithms include, but are not limited to, denoising, super-resolution, inpainting, deblurring, etc, FIG. 5 illustrates a first framework for deep learning based medical image formation and signal recovery. As shown in FIG. 5, a distorted sensor signal $J_\alpha(f)$ 502 is acquired by a sensor device of a medical image acquisition device. Reconstruction or transformation 510 is performed on the distorted sensor signal $J_\alpha(f)$ 502, resulting in a distorted signal $I(x)$ 504. The distorted signal $I(x)$ 504 is a medical image (e.g., CT or MRI image) generated by applying a transformation T to the distorted sensor signal $J_\alpha(f)$ 502, i.e., $I(x)=T[J_\alpha(f)]$. The distorted signal $I(x)$ 504 is then input to a trained DNN $\phi$ 520. The trained DNN $\phi$ 520 is trained in a training stage to perform one or more signal recovery task (e.g., denoising, super-resolution, inpainting, deblurring, etc.) on an input medical image. The trained DNN $\phi$ 520 processes the distorted signal $I(x)$ 504 and outputs a recovered signal $I(x)$ 506, i.e., $I(x)=\phi(I(x))$. The recovered signal $I(x)$ 506 is an enhanced medical image that more accurately represents the ground truth signal (i.e., actual anatomy of the subject being imaged) than the distorted signal $I(x)$ 504. In the first framework shown in FIG. 5, the DNN $\phi$ 520 is applied in the image domain to the reconstructed/transformed medical image $I(x)$ 504, after the reconstruction/transformation step.

Figure 6:
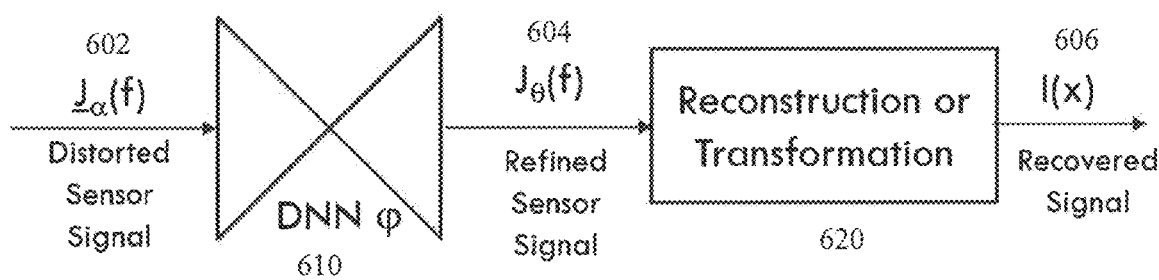
FIG. 6 illustrates a second framework for deep learning based medical image formation and signal recovery.

FIG. 6 illustrates a second framework for deep learning based medical image formation and signal recovery. As shown in FIG. 6, a distorted sensor signal $J_\alpha(f)$ 602 is acquired by a sensor device of a medical/image acquisition device. The distorted sensor signal $J_\alpha(f)$ 602 is then input to a trained DNN $\varphi$ 610, The trained DNN $\varphi$ 610 is trained in a training stage to perform one or more signal recovery task (e.g., denoising, super-resolution, inpainting, deblurring, etc.) on an input sensor signal. The trained DNN $\phi$ 610 processes the distorted sensor signal $J_\alpha(f)$ 602 and outputs a refined sensor signal $J_\theta(f)$ 604, i.e., $J_\theta(f)=\varphi(J_\alpha(f))$. The refined sensor signal $J_\theta(f)$ 604 corrects distortions in the distorted sensor signal $J_\alpha(f)$ 602 and thus more accurately represents the ground truth signal (i.e., actual anatomy of the subject being imaged) than the distorted sensor signal $J_\alpha(f)$ 602. Reconstruction or transformation 620 is then performed on the refined sensor signal $J_\theta(f)$ 604, resulting in a recovered signal $I(x)$ 606. The recovered signal $I(x)$ 606 is a medical image (e.g., CT or MRI image) generated by applying a transformation T to the refined sensor signal $J_\theta(f)$ 604, i.e., $I(x)=T[J_\theta(f)]$. In the second framework shown in FIG. 6, the DNN $\varphi$ 610 is applied in the sensor signal domain to the distorted sensor signal $J_\alpha(f)$ 602, prior to the reconstruction/transformation step.

Figure 7:
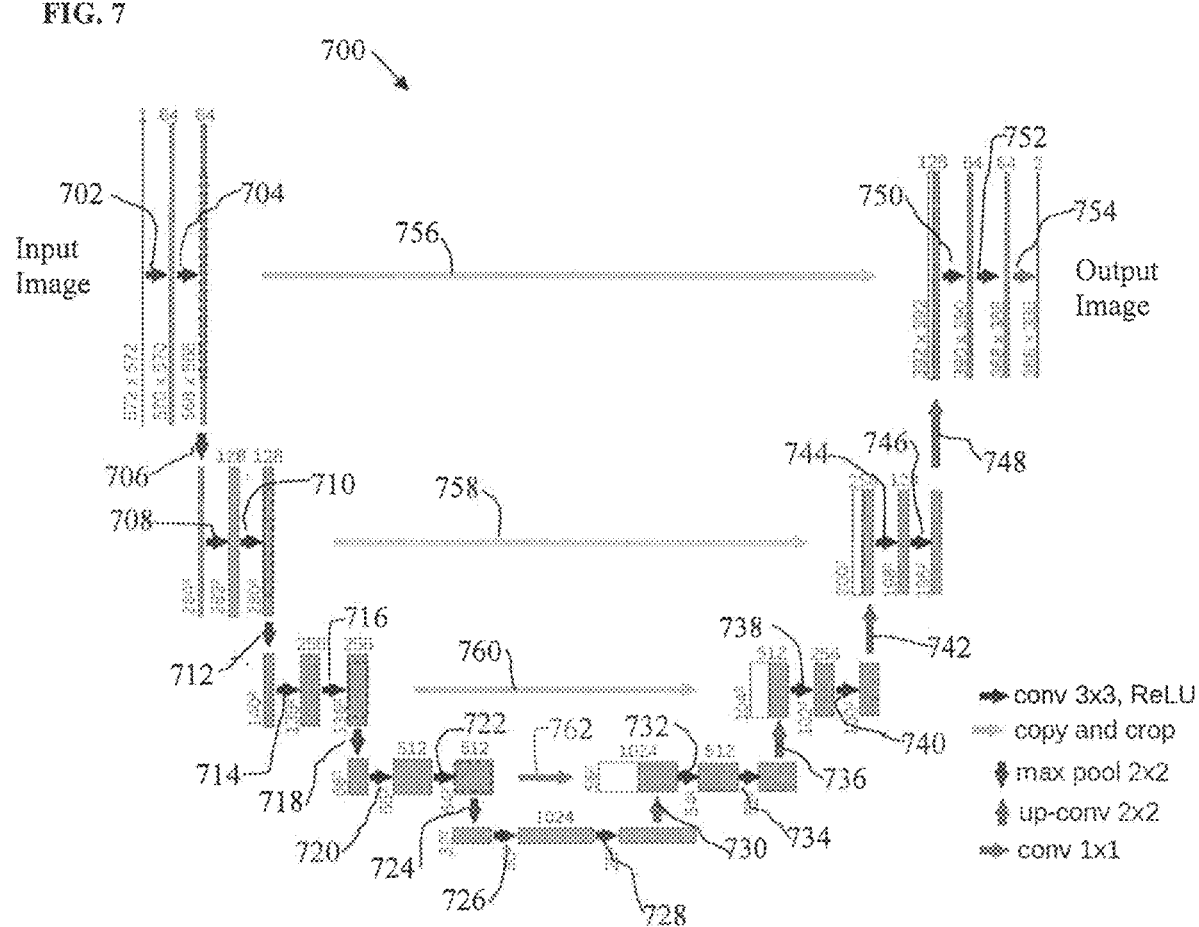
FIG. 7 illustrates an exemplary U-net architecture.

In the first framework shown in FIG. 5 or second framework shown in FIG. 6, the DNN $\phi$ 520 or $\varphi$ 610 can be implemented using a deep image-to-image neural network. Deep image-to-image neural networks are DNNs that input an image and output an image. U-net and V-net are examples of deep image-to-image neural networks. FIG. 7 illustrates an exemplary U-net architecture. As shown in FIG. 7, the U-net 700 includes a contracting (encoding) path and an expansive (decoding) path, which gives it a u-shaped architecture. The contracting path is a convolutional network includes repeated layers of convolutions 702, 704, 708, 710, 714, 716, 720, 722, and 726, each followed by a rectified linear unit (ReLU), and max pooling operations 706, 712, 718, and 724. During the contraction, the spatial information is reduced while feature information is increased. The expansive path includes repeated layers of convolutions 728, 732, 734, 738, 740, 744, 746, 750, 752, and 754, each followed by a rectified linear unit (ReLU), and up-convolutions 730, 736, 742, and 748. Copy and crop operations 756, 758, 760, and 762 are used to share high resolution features from the contracting path with the expansive path. The expansive path combines the feature and spatial information through a sequence of up-convolutions and concatenations with high-resolution features shared from the contracting path.

Figure 8:
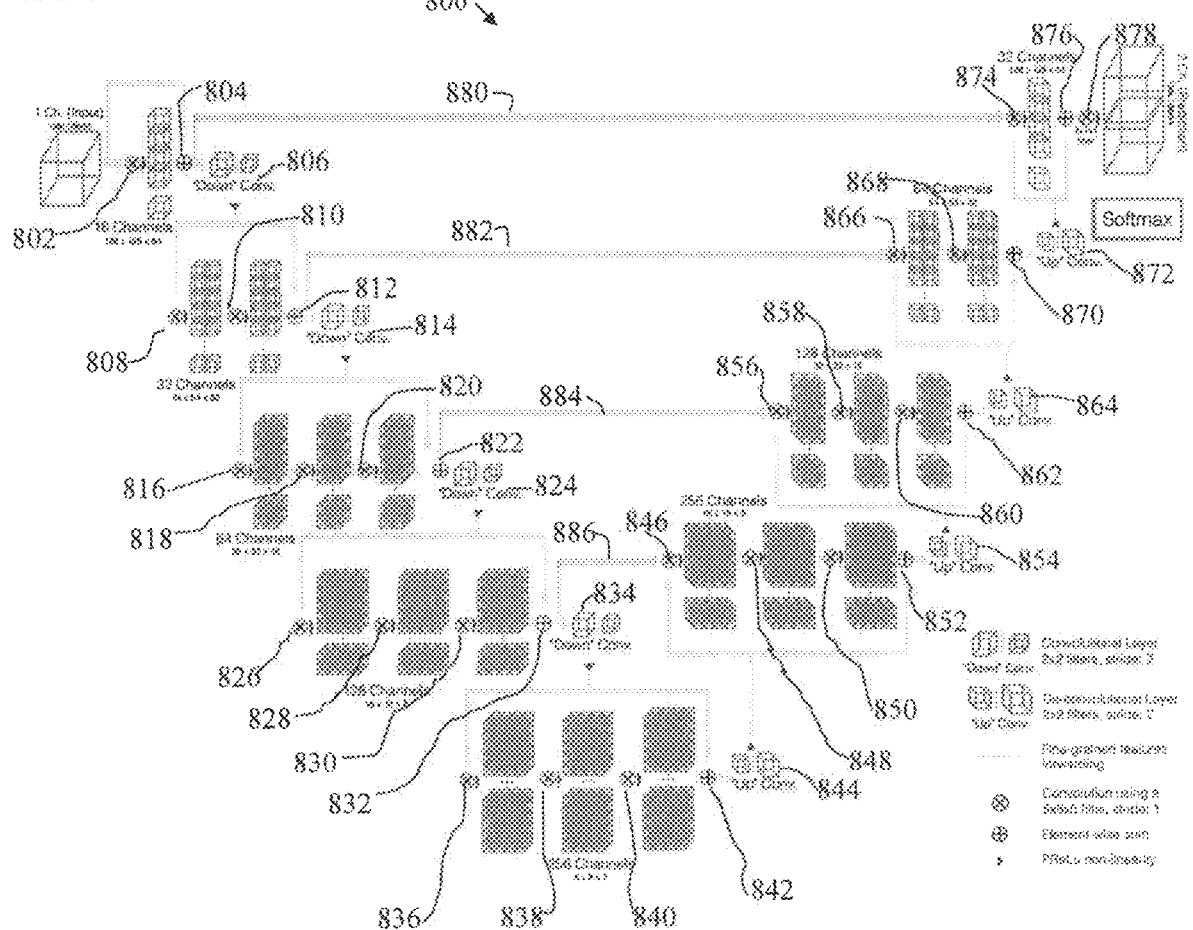
FIG. 8 illustrates an exemplary V-net architecture.

FIG. 8 illustrates an exemplary V-net architecture. The V-net 800 is similar to the U-net 700 of FIG. 7 in that it includes a compression (encoding) path and decompression (decoding) path. As shown in FIG. 8, both the compression and decompression paths include repeated convolution operations 802, 808, 810, 816, 818, 820, 826, 828, 830, 836, 838, 840, 846, 848, 850, 856, 858, 860, 866, 868, 874, and 878. In the compression path, down-convolution layers 806, 814, 824, and 834 are used in place of pooling layers to reduce the resolution of the feature maps. In the decompression path, up-convolution (deconvolution) layers 844, 854, 864, and 872 are used to increase the size of the feature maps. At each stage of the V-net 800, a residual function is learned. The input of each stage is used in the convolutional layers and processed through the non-linearities and added to the output of the last convolutional layer of that stage using element-wise sum operations 804, 812, 822, 832, 842, 852, 862, 870, and 876 in order to enable learning a residual function. This architecture ensures convergence. Fine-grained feature forwarding operations 880, 882, 884, and 886 are used to share fine-grained features from the compression path with the decompression path.

Figure 9:
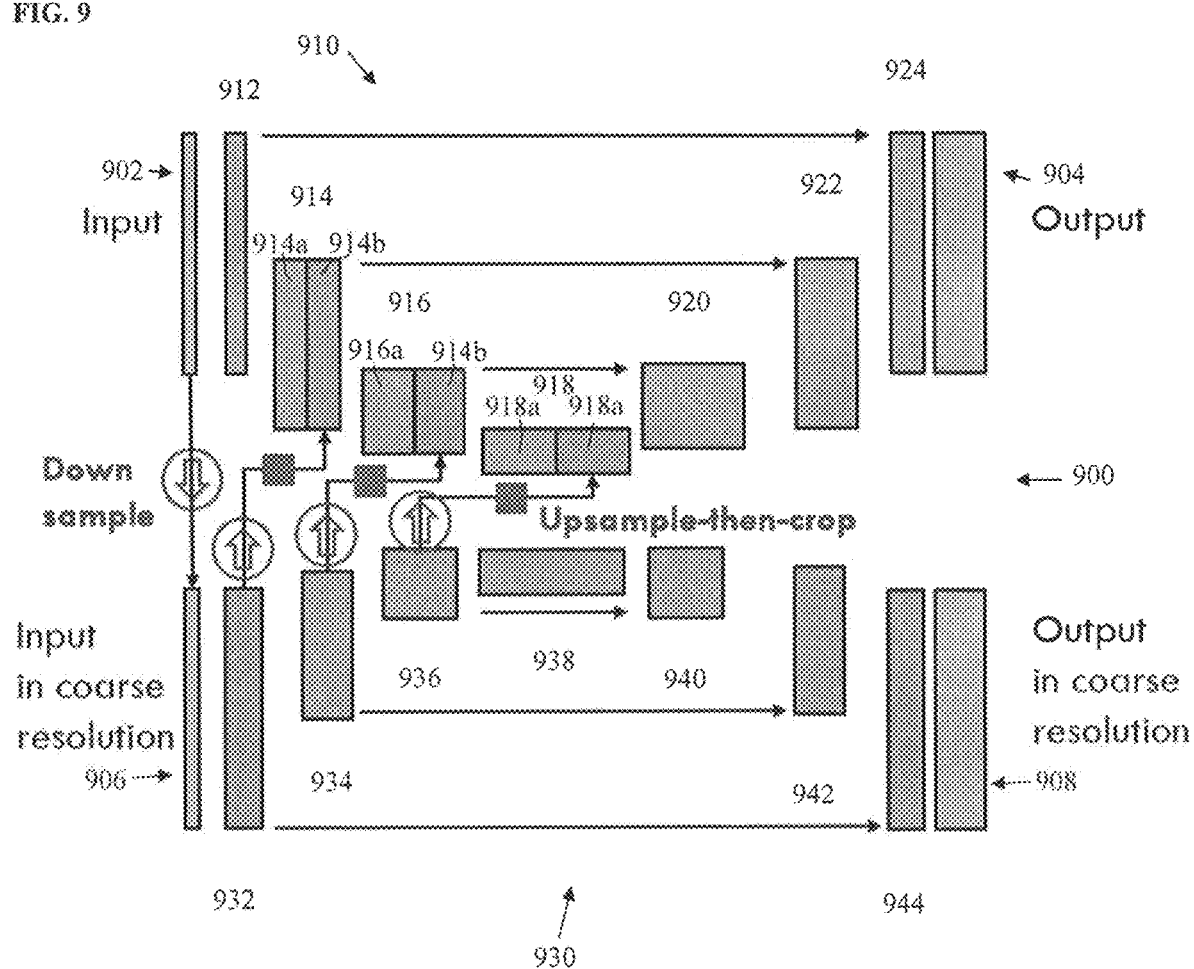
FIG. 9 illustrates an H-net architecture according to an embodiment of the present invention.

According to an advantageous embodiment of the present invention, a new DNN architecture, referred to herein as an "H-net", is introduced. The H-net provides improvements in medical image analysis, and in particular medical image signal recovery, as compared with existing DNN architectures (e.g., U-Net and V-net) by more effectively taking into account multi-scale contextual features in the medical image data. FIG. 9 illustrates an H-net architecture according to an embodiment of the present invention. The H-net architecture illustrated in FIG. 9 can be used for the DNN $\phi$ 520 in the first framework for medical image signal recovery shown in FIG. 5 or the DNN $\varphi$ 610 in the second framework for medical image signal recovery shown in FIG. 6, As shown in FIG. 9, the H-net 900 combines two deep image-to-image networks: a first network 910 trained to process an input image 902 and generate an output image 904 in the original resolution of the input image 902, and a second network 930 trained to process a coarse resolution input image 906 and generate a coarse resolution output image 908. In the embodiment shown in FIG. 9, the first network 910 and second network 930 of the H-net 900 are each implemented similarly to U-nets and are combined in an H-shaped architecture in which features are shared between layers of the second network 930 and the first network 910. When an input image 902 to be processed by the H-net 900 is received, the input image 902 is down-sampled to generate the coarse resolution input image 906. The input image 902 is down-sampled to a resolution for which the second network 930 has been trained. This can be any resolution that is coarser than the input image 902, In an exemplary implementation, this down-sampling is of a factor of 2 or 4.

The first network 910 includes a plurality of encoding or compression stages 912, 914, 916, and 918 and a plurality of decoding or decompression stages 920, 922, and 924. Stage 912 inputs the input image 902. Stages 912, 914, 916, 918, 920, and 922 each generate feature maps, which are input to the subsequent stage. Stage 924 generates the output image 904. In the encoding stages 912, 914, 916, and 918 the spatial information (size of the feature maps) is reduced while feature information (number of feature maps) is increased. In an exemplary implementation, the encoding stages 912, 914, and 916 each include one or more convolutional layers followed by a max-pooling layer. Stage 918 includes one or more convolutional layers. Decoding stages 920 and 922 each include one or more convolutional layers followed by an up-convolution layer. Stage 924 includes one or more convolutional layers and outputs the output image 904. An element-wise activation function is applied to the feature maps after each convolutional layer, in an exemplary embodiment, a rectified linear (ReLU) is used for the activation function for each convolutional layer. However, other activation functions may be used, such as a Leaky ReLU or a Very Leaky ReLU, As in the U-Net or V-net, fine-grained spatial features are shared between encoding stages 912, 914, and 916 and corresponding decoding stages (i.e., stages with same size feature maps) 924, 922, and 920, respectively.

The second network 930 also includes a plurality of encoding or compression stages 932, 934, 936, and 938 and a plurality of decoding or decompression stages 940, 942, and 944. Stage 932 inputs the coarse resolution input image 906. Stages 932, 934, 936, 938, 940, and 942 each generate feature maps, which are input to the subsequent stage. Stage 944 generates the coarse resolution output image 908. In the encoding stages 932, 934, 936, and 938 the spatial information (size of the feature maps) is reduced while feature information (number of feature maps) is increased. In an exemplary implementation, the encoding stages 932, 934, and 936 each include one or more convolutional layers followed by a max-pooling layer. Stage 938 includes one or more convolutional layers. Decoding stages 940 and 942 each include one or more convolutional layers followed by an up-convolution layer. Stage 944 includes one or more convolutional layers and outputs the coarse resolution output image 908. An element-wise activation function is applied, to the feature maps after each convolutional layer. In an exemplary embodiment, a rectified linear (ReLU) is used for the activation function for each convolutional layer. However, other activation functions may be used, such as a Leaky ReLU or a Very Leaky ReLU. Fine-grained spatial features are shared between encoding stages 932, 934, and 936 and corresponding decoding stages (i.e., stages with same size feature maps) 944, 942, and 940, respectively.

According to an advantageous embodiment of the present invention, feature maps generated in encoding stages 932, 934, and 936 of the second network 930 are not only input to the subsequent stages (934, 936, and 938, respectively) of the second network 930, but are also up-sampled, then cropped and input to the subsequent stages (914, 916, and 918, respectively) of the first network 910. When the input image 902 to be processed by the H-net 900 is received, the input image 902 is down-sampled to generate the coarse resolution input image 906. The coarse resolution input image 906 is then processed by the encoding stages 932, 934, 936, and 938 and decoding stages 940, 942, and 944 of the second network 930 to generate the coarse resolution output image 908. Encoding stage 932 of the second network 930 inputs the coarse resolution input image and generates feature maps that are input to the subsequent stage 934 of the second network 930. These feature maps are also input to the subsequent stage 914 of the first network 910 after being up-sampled to the original resolution of the input and cropped to match the size of the feature maps input to stage 914 from stage 912 of the first network. Encoding stage 934 of the second network 930 inputs the feature maps output from the preceding stage 932 and generates feature maps that are input to the subsequent stage 936 of the second network 930. These feature maps are also up-sampled and cropped, and then input to the subsequent stage 916 of the first network 910. Encoding stage 936 of the second network 930 inputs the feature maps output from the preceding stage 934 and generates feature maps that are input to the subsequent stage 938 of the second network 930. These feature maps are also up-sampled and cropped, and then input to the subsequent stage 918 of the first network 910.

The input image 902 is processed by the encoding stages 912, 914, 916, and 918 and the decoding stages 920, 922, and 924 of the first network 910 to generate the output image 904. Encoding stages 914, 916, and 918 of the first network 910 input feature maps from the preceding stages (912, 914, and 916, respectively) of the first network 910, as well as feature maps from the preceding stages (922, 924, and 926, respectively) of the second network 930. Stage 912 of the first network 910 inputs the input image 902 and generates feature maps (914a), which are input to the subsequent stage 914 of the first network 910. Encoding stage 914 of the first network 910 inputs the feature maps 914a generated by the preceding stage 912 of the first network 910 and also inputs up-sampled and cropped feature maps 914b generated by the preceding stage 922 of the second network 930. Encoding stage 914 generates feature maps (916a) based on both sets of input feature maps 914a and 914b. Encoding stage 916 of the first network 910 inputs the feature maps 916a generated by the preceding stage 914 of the first network 910 and also inputs up-sampled and cropped feature maps 916b generated by the preceding stage 924 of the second network 930. Encoding stage 916 generates feature maps (918a) based on both sets of input feature maps 916a and 916b, Encoding stage 918 of the first network 910 inputs feature maps 918a generated by the preceding stage 916 of the first network 910 and also inputs up-sampled and cropped feature maps 918b generated by the preceding stage 926 of the second network 930. Encoding stage 918 generates feature maps based on both sets of input feature maps 918a and 918b. Decoding stage 920 inputs the feature maps generated by the preceding stage 918 and the fine-grained spatial features shared from encoding stage 916 and generates feature maps, which are input to decoding stage 922. Decoding stage 922 inputs the feature maps generated by the preceding stage 920 and the fine-grained spatial features shared from encoding stage 914 and generates feature maps, which are input to decoding stage 924. Decoding stage 924 inputs the feature maps generated by the preceding stage 922 and the fine-grained spatial features shared from encoding stage 912 and generates the output image 904.

The H-net 900 is trained based on a set of training data including training input images and corresponding ground truth output images. The training input images and ground truth output images are down-sampled to generate coarse resolution training input images and ground truth coarse resolution output images, which are used to train the second network 930. I an advantageous embodiment, the training of the first and second networks 910 and 930 is performed in a sequential fashion in two stages. In the first training stage, the second network 930 is trained. The second network 930 can be trained using back propagation and gradient descent to learn weights that minimize a loss function that measures the difference/error between and the ground truth coarse resolution output images and predicted coarse resolution output images generated by the second network 930 over the set of coarse resolution training input images. Then in the second training stage, the first network 910 is trained. The first network 910 can be trained using back propagation and gradient descent to learn weights that minimize a loss function that measures the difference/error between and the ground truth output images and predicted output images generated by the first network 910 over the set of training input images. In a possible implementation, both the first network 901 and the second network 930 can be trained jointly in the second training stage.

The H-net architecture of FIG. 9 can be used for DNN-based medical image signal recovery in the first framework (FIG. 5) or the second framework (FIG. 6) described above, That is, the H-net 900 can be applied in the image domain to medical images after the transformation has been performed or can be applied in the sensor signal domain to a sensor signal (e.g., sinogram) prior to performing the transformation. The H-net architecture of FIG. 9 can also be used for one or both DNNs in a unified dual-domain network described below. Since the features generated in the encoding stages 914, 916, and 918 of the first network 910 take into account features generated based on the original resolution input image 902 as well as features generated (by encoding stages of the second network 930) at coarser resolution, the resulting features are more informed of the image context and more powerful than the features generated in conventional image-to-image networks. Accordingly, the H-net 900 provides more powerful and accurate medical image signal recovery than conventional image-to-image networks.

Although the first and second frameworks shown in FIGS. 5 and 6 are somewhat effective for some medical image signal recovery tasks, these frameworks only consider a single domain (i.e., image domain or sensor single domain). This can lead to inadequacies in many signal recovery tasks. In the first framework of FIG. 5, the DNN operates in the medical image domain. However, for some medical imaging modalities, such as CT, the sensor signal (sinogram) domain provides information that can be very beneficial for medical image signal recovery tasks and this information may be difficult to retrieve in the medical image after transformation/reconstruction. For example, metal artifacts that cause streaking in CT images become very local and appear as dots in sinograms. Modeling such artifacts is much more difficult in the image domain. The second framework of FIG. 6, performs signal recovery in the sensor signal domain, but the DNN cannot always take into account the effect of the signal recovery on the final output image in the image domain. For example, reduction of CT metal artifacts in the sinogram domain often introduces secondary artifacts to appear in the reconstructed CT images. According to an advantageous embodiment of the present invention, a dual-domain network for combined medical image formation and analysis/signal recovery is provided. The unified includes deep neural networks (DNNs) that enhance medical image data in the pre-transformation signal domain and the post-transformation image domain and a differentiable transformation/reconstruction layer that allows the DNNs to be trained together end-to-end. The dual-domain network provides significant improvements in accuracy over existing techniques for medical image signal recovery.

Figure 10:
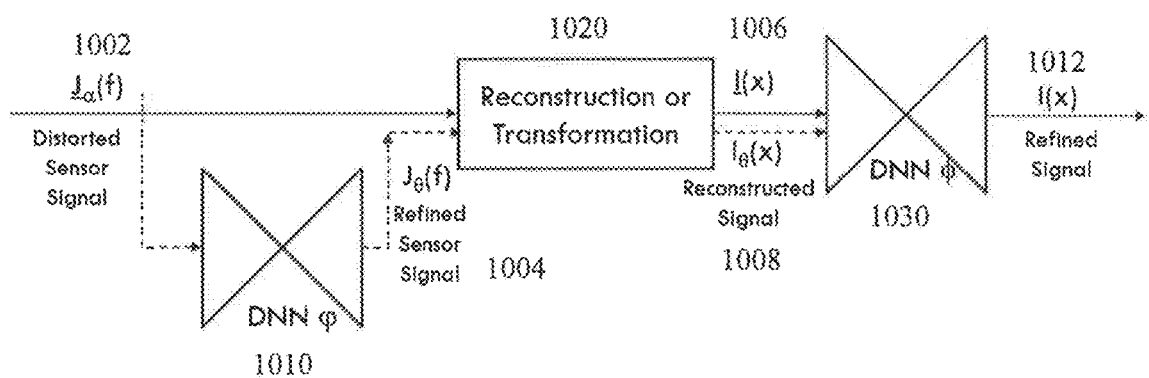
FIG. 10 illustrates a dual-domain network for coupled medical image formation and signal recovery according to an embodiment of the present invention.

FIG. 10 illustrates a dual-domain network for coupled medical image formation and signal recovery according to an embodiment of the present invention. As shown in FIG. 10, the dual-domain network 1000 includes a first DNN 1010, a reconstruction layer 1020, and a second DNN 1030. The first DNN $\varphi$ 101 is applied in the sensor domain to a distorted sensor signal $\underline{J}_\alpha(f)$ 1002. The distorted sensor signal $\underline{J}_\alpha(f)$ 1002 is acquired by a sensor device of a medical image acquisition device and then input to the first DNN $\varphi$ 1010. The distorted sensor signal $\underline{J}_\alpha(f)$ 1002 is also input to the reconstruction layer 1020. The first DNN $\varphi$ 1010 processes the distorted sensor signal $\underline{J}_\alpha(f)$ 1002 and outputs a refined sensor signal $J_\theta(f)$ 1004, i.e., $J_\theta(f)=\varphi(\underline{J}_\alpha)$. The refined sensor signal $J_o(f)$ 1004 is input to the reconstruction layer 1020.

The reconstruction layer 1020 performs reconstruction or transformation on the distorted sensor signal $\underline{J}_\alpha(f)$ 1002 to generate a first reconstructed signal $\underline{I}(x)$ 1006. The first reconstructed signal $\underline{I}(x)$ 1006 is a medical image (e.g., CT image) generated by applying a transformation T to the distorted sensor signal $\underline{J}_\alpha(f)$ 1002, i.e., $\underline{I}(x)=T[\underline{J}_\alpha(f)]$. The reconstruction layer 1020 also performs reconstruction of transformation on the refined sensor signal $J_\theta(f)$ 1004 generated by the first DNN 1010, resulting in a second reconstructed signal $I_\theta(x)$ 1008. The second reconstructed signal $I_\theta(x)$ 1008 is a medical image (e.g., CT image) generated by applying the transformation T to the refined sensor signal $J_\theta(f)$ 1004, i.e., $I_\theta(x)=T[J_\theta(f)]$.

The second DNN 1030 is applied in the medical image domain to generate the refined signal I(x) 1012. The second DNN 1030 inputs both the first reconstructed signal $\underline{I}(x)$ 1006 reconstructed from the distorted sensor signal $\vec{J}_\alpha(f)$ 1002 and the second reconstructed signal $I_\theta(x)$ 1008 reconstructed from the refined sensor signal $J_\theta(f)$ 1004. The second DNN 1030 processes the first reconstructed signal $\underline{I}(x)$ 1006 and the second reconstructed signal $I_\theta(x)$ 1008 and outputs the refined signal I(x) 1012. The refined signal I(x) 1012 is an enhanced medical image that more accurately represents the ground truth signal (i.e., actual anatomy of the subject being imaged) than the first reconstructed signal $\underline{I}(x)$ 1106 and the second reconstructed signal $I_\theta(x)$ 1008.

The first and second DNNs 1010 and 1030 can be implemented using deep image-to-image networks. In an advantageous embodiment, one or both of the first and second DNNs 1010 and 1030 can be implemented using an H-net architecture, such as the H-net 900 of FIG. 9. However, the present invention is not limited thereto, and other deep image-to-image network architectures (e.g., U-Net, V-net, convolutional encoder-decoder) may be used as well. According to an advantageous embodiment, the dual-domain network 100 is trained together end-to-end to perform one or more medical image signal recovery tasks (e.g., denoising, super-resolution, inpainting, deblurring, etc.) in an advantageous embodiment, the reconstruction layer 1020 is differentiable, which allows back-propagation of gradients from the second DNN 1030 through the reconstruction layer 1020 to the first DNN 1010 during training. In an advantageous embodiment, the reconstruction layer 1020 for CT image reconstruction is implemented using a novel Radon inversion layer that includes a parallel-beam conversion module, a filtering module, and a back-projection module. The parallel-beam conversion module transforms a received fan-beam sinogram to a parallel-beam sinogram, which allows filtered back-projection to be performed more effectively and efficiently. Parallel-beam filtered back-projection is then realized by the subsequent filtering and back-projection modules. This Radon inversion layer is described in greater detail in the CT metal artifact reduction example below. The parallel-beam filtered back-projection of the Radon inversion layer results in a differentiable reconstruction layer 1020, in which any loss in the image domain (second DNN 1030) will be aggregated and projected to the sinogram domain (first DNN 1010) during training. Accordingly, gradient descent back-propagation methods can be used to train the first and second DNNs together end-to-end to minimize a combined loss function for both networks. In an advantageous embodiment, for CT image recovery, the combined loss function may include a respective loss for each DNN 1010 and 1030 that measures the difference/error between and the ground truth outputs and predicted outputs of each DNN 1010 and 1030 over a set of training data and a Radon consistency loss that maintains sinogram consistency by penalizing a sinogram generated by the first DNN 1010 if it leads to secondary artifacts in the image domain after reconstruction by the radon inversion layer (reconstruction layer 1020).

Figure 11:
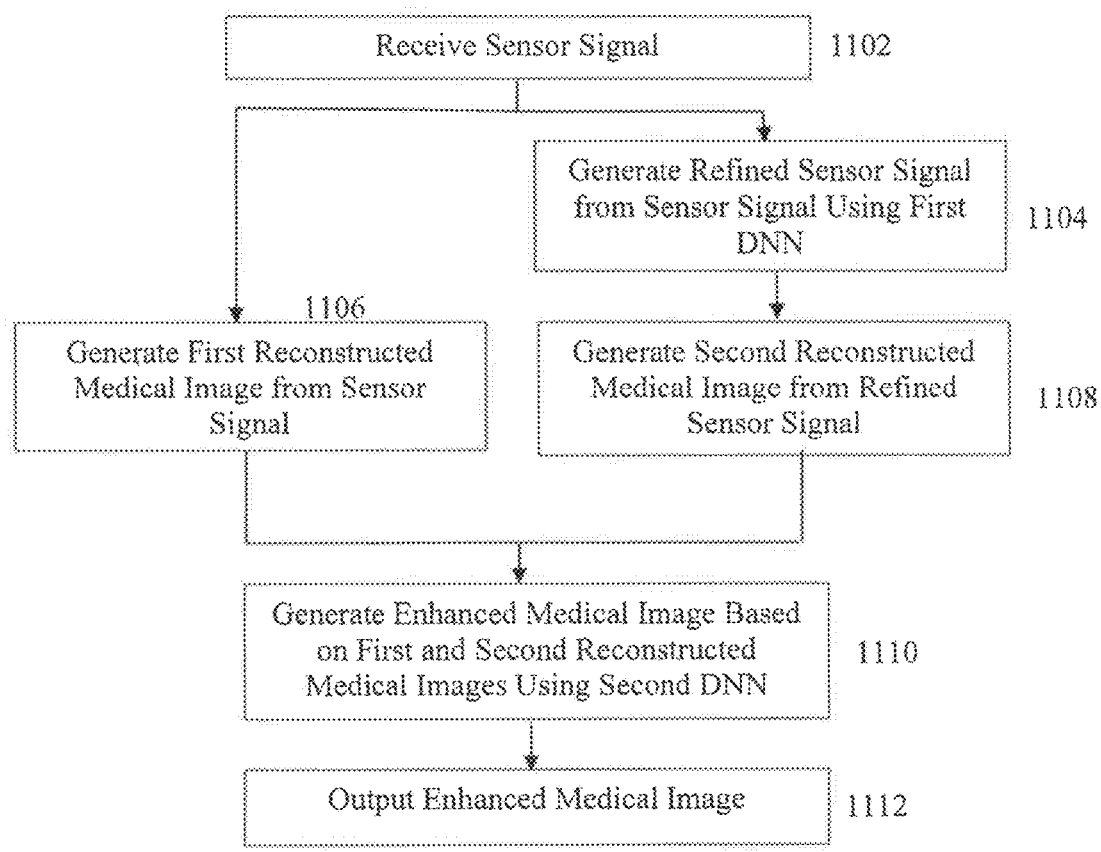
FIG. 11 illustrates a method for medical image formation and medical image signal recovery using a unified dual-domain network according to an embodiment of the present invention.

FIG. 11 illustrates a method for medical image formation and medical image signal recovery using a unified dual-domain network according to an embodiment of the present invention. The method of FIG. 11 is described with reference to the unified dual-domain network 1000 shown in FIG. 10. At step 1102, a sensor signal is received from a sensor of a medical image acquisition device. In an exemplary embodiment, the medical image acquisition device is a CT scanner and the sensor signal is a sinogram. However, the present invention is not limited thereto and may be applied to other types of medical imaging modalities as well. The received sensor signal may have distortions, e.g., metal artifacts, blurring, noise, low image quality, etc., and is referred to in FIG. 10 as the distorted sensor signal $J_\alpha(f)$.

At step 1104, a refined sensor signal is generated from the received sensor signal by the first DNN 1010. The first DNN 1010 inputs the received sensor signal $J^\alpha(f)$ and generates the refined sensor signal $J_\theta(f)$. The first DNN 1010 attempts to correct the distortions in the received sensor signal in the sensor signal (e.g., sinogram) domain and outputs the refined sensor signal $J_\theta(f)$, which is an enhanced sensor signal with reduced distortions as compared to the received sensor.

At step 1106, a first reconstructed medical image is generated from the received sensor signal. The reconstruction layer 1020 inputs the received sensor signal $J_\alpha(f)$ and reconstructs the first reconstructed medical image $I(x)$ by applying a transformation T to the received sensor signal $J_\alpha(f)$. In an advantageous embodiment, for CT image reconstruction, the received sensor signal $J_\alpha(f)$ can be a fan-beam sinogram and the reconstruction layer 1020 can be implemented using a differentiable Radon inversion layer that converts the fan-beam sinogram to a parallel-beam sinogram and then performs parallel-beam filtered back-projection to generate the first reconstructed medical image $I(x)$.

At step 1108, a second reconstructed medical image is generated from the refined sensor signal. The reconstruction layer 1020 inputs the refined sensor signal $J_\theta(f)$ generated by the first DNN 1010 and reconstructs the second reconstructed medical image $I_\theta(x)$ by applying, the transformation T to the refined sensor signal $J_\theta(f)$. In an advantageous embodiment, for CT image reconstruction, the refined sensor signal $J_\theta(f)$ can be a fan-beam sinogram and the reconstruction layer 1020 can be implemented using a differentiable Radon inversion layer that converts the fan-beam sinogram to a parallel-beam sinogram and then performs parallel-beam filtered back-projection to generate the second reconstructed medical image $I_\theta(x)$.

At step 1110, an enhanced medical image is generated based on the first and second reconstructed medical images by the second DNN 1030. The second DNN 1030 inputs the first reconstructed medical image $I(x)$ reconstructed from the received sensor signal $J_\alpha(f)$ and the second reconstructed medical image $I(x)$ reconstructed from the refined sensor signal $J_\theta(f)$ and generates the enhanced medical image $I(x)$. The first DNN 1030 corrects distortions in the image domain, as well as secondary artifacts caused by the correction of the distortions in the signal domain by the first DNN 1010, and outputs a resulting recovered medical image $I_\theta(x)$ which is enhanced to correct the distortions and more accurately represent the true anatomy of the subject being imaged.

At step 1112, the enhanced medical image is output. The enhanced medical image can be output by displaying the enhanced medical image on a display device. The display device can be part of the medical image acquisition device or a display device of another computer system.

The method of FIG. 11 and dual-domain network 1000 of FIG. 10 can be applied to perform a variety of medical image signal recovery tasks. For example, the dual domain network 1000 can be trained to perform one or more signal recovery tasks that improve image quality, such as removing artifacts due to metal, motion, etc., denoising, super-resolution (slice interpolation), etc. This provides output medical images with improved image quality, as compared with conventional techniques, which helps doctors to be able to more accurately interpret medical images for better diagnosis and treatment. In an embodiment of the present invention, the dual domain network 1000 can be trained to recover high dose CT images from sensor data acquired with low doses of radiation. This leads to reduced dose exposure for the patient, which makes medical imaging safer for the patient. In another embodiment, the dual domain network 1000 can be trained to recover full high quality medical image volumes from under-sampled acquisitions. For example, a fell MRI volume can be recovered from a sparse MRI dataset. This provides a benefit of making imaging faster, which provides higher throughput and better patient experience. In another embodiment, the dual domain network 1000 can also make medical imaging more accessible by being trained to recover results similar medical images achieved using more expensive medical imaging machines from sensor data acquired using less expensive medical imaging machines. In another embodiment, a registration to a standard view can be coupled with the reconstruction/transformation performed in the dual-domain network 1000, thus making medical imaging more standard. Additional details on performing CT metal artifact reduction using the dual-domain network 1000 are described below.

In an advantageous embodiment of the present invention, a dual domain network can be used to perform CT image formation and CT metal artifact reduction. CT is an imaging modality commonly used for medical diagnosis and treatment. CT images reconstructed from X-ray projections allow effective medical diagnosis and treatment, However, due to increasingly common metallic implants, CT images are often adversely affected by metal artifacts which not only exhibit undesirable visual effects but also increase the possibility of false diagnosis. This creates the problem of metal artifact reduction (MAR), for which existing solutions are inadequate.

Unlike typical image restoration tasks such as super-resolution, compression artifact removal, and denoising, metal artifacts are often structured and non-local. Modeling such artifacts in the image domain is extremely difficult, Therefore, before the emergence of deep learning, most existing techniques attempted to reduce metal artifacts in the X-ray projection (sinogram) domain. In such techniques, the metal-corrupted regions are viewed as missing and replaced by interpolated values. However, as the projections are taken from a single object under a certain geometry, physical constraints should be satisfied by the enhanced sinogram. Otherwise, severe secondary artifacts can be introduced in the reconstructed CT images.

Recently, motivated by the success of deep learning in solving ill-posed problems, several techniques have been proposed to overcome the difficulties in MAR. In Wang et al., "Conditional Generative Adversarial Networks for Metal Artifact Reduction in CT Images of the Ear", In *Medical Image Computing and Computer Assisted Intervention* (*MICCAI*), 2018, the pix2pix model was applied to reduce metal artifacts in the CT image domain. In Zhang et al., "Convolutional Neural Network Based Metal Artifact Reduction in X-ray Computed Tomography", *IEEE Transactions on Medical Imaging*, 2018, it was proposed to first estimate a prior image by a convolutional neural network (CNN). Based on the prior image, metal-corrupted regions in the sinogram are filled with surrogate data through several post-processing steps for reduced secondary artifacts. In Park et al., "Sinogram-Consistency Learning in CT for Metal Artifact Reduction", *arXiv preprint arXiv: 1708.00607*, 2017, a U-Net was applied to directly restore metal-corrupted sinograms. Although metal artifacts can be reduced by these deep learning approaches, in the existing approaches, the use of either image domain enhancement or sinogram domain enhancement is limited in being able to remove both metal shadows and secondary artifacts.

Embodiments of the present invention utilize a Dual Domain Network (DuDoNet) to address the limitations of the existing techniques for MAR by learning two deep neural networks (e.g., CNNs) on dual domains to restore sinograms and CT images simultaneously. Using the DuDoNet described herein, image domain enhancement is improved by fusing information from the sinogram domain, and inconsistent sinograms are corrected by the learning signal back-propagated from the image domain to reduce secondary artifacts.

In an advantageous embodiment of the present invention, the novel DuDoNet includes a sinogram enhancement network (SE-Net), a Radon inversion layer (RIL), and an image enhancement network (IE-Net). To address an issue that in the sinogram domain, information about small metal implants tends to vanish in higher layers of the network due to down-sampling, embodiments of the present invention utilize a mask pyramid U-net architecture for SE-Net, which retains metal mask information across multiple scales. An advantageous aspect of the dual-domain learning MAR described herein is the RIL that reconstructs CT images using the filtered back-projection (FBP) algorithm and efficiently back-propagates gradients from the image domain to the sinogram domain. Based on RIL, embodiments of the present invention introduce a Radon consistency loss to penalize secondary artifacts in the image domain. The IE-Net refines CT images vis residual learning. Extensive experiments from hundreds of patients demonstrate that the dual domain enhancement method described herein generates superior artifact-reduced CT images.

At least the following aspects of the present invention provide improvements over existing techniques for CT MAR that result is more accurate metal artifact reduction in CT images. Embodiments of the present invention provide an end-to-end trainable dual-domain network for MAR. The network is able to accurately recover details corrupted by metal artifacts. Embodiments of the present invention utilize a mask pyramid (MP) U-Net to improve sinogram refinement. The MP architecture improves performance especially when small metallic implants are dominated by non-metal regions. Embodiments of the present invention utilize an RIL to enable efficient dual domain learning. The RIL can be used in various reconstruction algorithms. Embodiments of the present invention utilize a Radon consistency (RC) loss to penalize secondary artifacts in the image domain. Gradients of the loss in the image domain are back-propagated through the RIL to the sinogram domain for improved consistency.

Tissues inside the human body, such as bones and muscles, have different X-ray attenuation coefficients μ. If we consider a 2D slice of the human body, the distribution of the attenuation coefficients $X=\mu(x, y)$ represents the underlying anatomical structure. The principle of CT imaging is based on the fundamental Fourier Slice Theorem, which guarantees that the 2D function X can be reconstructed solely from its dense 1D projections. In CT imaging, projections of the anatomical structure X are inferred by the emitted and received X-ray intensities through the Lambert-Beer Law. We consider the following CT model; under a polychromatic X-ray source with energy distribution $\eta(E)$:

$$Y=-\log \int \eta(E)\exp\{-\mathcal{P} X(E)\}dE, \quad (1)$$

where $\mathcal{P}$ is the projection generation process, and Y represents the projection data (sinogram). The 2D X(E) is the anatomical structure (CT image) we want to recover from the measured projection data Y.

For normal body tissues, X(E) is almost constant with respect to the X-ray energy E. If we let X=X (E), then $$Y=\mathcal{P} X. \quad (2)$$

Therefore, given the measured projection data (sinogram) Y, the CT image $\hat{X}$ can be inferred by using a reconstruction algorithm $\mathcal{P}^{\dagger}:\hat{X}=\mathcal{P}^{\dagger}Y$. As used herein, $\mathcal{P}^{\dagger}$ denotes the linear operation for reconstruction.

However, when metallic implants $I_M(E)$ are present, $X(E)=X+I_M(E)$, where X(E) has large variations with respect to E due to $I_M$. In this case, Equation (1) becomes:

$$Y=\mathcal{P} X-\log \int \eta(E)\exp\{-\mathcal{P} I_M(E)\}dE, \quad (3)$$

where the region of $\mathcal{P} I_M$ in Y will be referred to hereinafter as the metal trace. The reconstruction algorithm is applied, as follows:

$$\mathcal{P}^{\dagger}Y=\hat{X}- \mathcal{P}^{\dagger} \log \int \eta(E)\exp\{-\mathcal{P} I_M(E)\}dE. \quad (4)$$

The term after $\hat{X}$ in Equation (4) is the metal artifact. It is clear that the perfect MAR can be achieved only if the last term in Equation (4) is suppressed while the $\hat{X}$ term is unaffected. However, it is generally an ill-posed problem since both terms contribute to the region of the metal trace.

One commonly adopted strategy in MAR is to formulate sinogram completion as an image inpainting task. Data within the metal trace are viewed as missing and filled through interpolation. Linear interpolation (LI) is a widely used method in MAR due to its simplicity. Meyer et al., "Normalized Metal Artifact Reduction (NMAR) in Computed Tomography", *Medical Physics*, 37(10):5482-5493, 2010, proposed the NMAR algorithm, where sinograms are normalized by tissue priors before performing LI. NMAR requires proper tissue segmentation in the image domain, which is unreliable when severe metal artifacts are present. In Mehranian et al., "X-ray Metal Artifact Reduction Using Wavelet Domain 10 Sparse Regularization", *IEEE Transactions on Medical Imaging*, 32:1707-1722, 2013, sinograms are restored by enforcing sparsity constraints in the wavelet domain. In general, such inpainting-based approaches fail to replace the data of $\mathcal{P}X$ in Equation (3) within the metal trace by consistent values. This inconsistency introduced in the sinogram data leads to noticeable secondary artifacts after reconstruction.

Another technique used for MAR is iterative reconstruction, in iterative reconstruction, MAR can be formulated as the following optimization problem:

$$\hat{X} = \min_{X} \|(1 - \mathcal{M}_t) \odot (\mathcal{P}X - Y)\|^2 + \lambda R(X), \qquad (5)$$

where $\mathcal{M}_t$ is the metal trace mask, $\mathcal{M}_t=1$ on the metal trace and $\mathcal{M}_t=0$ otherwise. R is some regularization function, e.g. total variation (TV) and sparsity constraints in the wavelet domain. Equation (5) is often solved through iterative approaches such as the split Bregman algorithm. Iterative reconstruction usually suffers from long processing time as they require multiplying and inverting huge matrices in each iteration. More importantly, hand-crafted regularization RV) does not capture the structure of metal artifacts and would result in an over-smoothed reconstruction. Recently, Zhang et al., "A Reweighted Joint Spatial-Radon Domain CT Image Reconstruction Model for Metal Artifact Reduction", *SIAM J. Imaging Sciences*, 11:707-733, 2018, proposed a reweighted joint spatial-radon (JSR) method which combines NMAR into Equation (5) and jointly solves for X and the interpolated sinogram. Similar to NMAR, the weighting strategy in re-weighted JSR requires tissue segmentation. In phantom study, better performance against NMAR is achieved by re-weighted JSR. However, the improvements remain limited for non-phantom CT images.

Deep learning has also been applied to MAR. Convolutional neural networks (CNNs) have the ability to model complex structures within data. Motivated by the success of deep neural networks (DNNs) in solving inverse problems, Gjesteby et al., "Deep Learning Methods to Guide CT Image Reconstruction and Reduce Metal Artifacts", In *SPIE Medical Imaging*, 2017, and Park et al., "Sinogram-Consistency Learning in CT for Metal Artifact Reduction", *arXiv preprint arXiv:* 1708.00607, 2017, proposed to refine sinograms using a CNN for improved consistency. Zhang et al., "Convolutional Neural Network Based Metal Artifact Reduction in X-ray Computed Tomography", *IEEE Transactions on Medical Imaging*, 2018 proposed a CNNMAR model to first estimate a prior image by a CNN and then correct the sinogram similar to NMAR. However, even with the strong expressive power of CNNs, these approaches still suffer from secondary artifacts due to inconsistent sinograms. Gjesteby et al., "Reducing Metal Streak Artifacts in CT Images via Deep Learning: Pilot Results", In *The 14th international Meeting on Fully Three-Dimensional Image Reconstruction in Radiology and Nuclear Medicine*, pp. 611-814, 2017, Xu et al "Deep Residual Learning Enabled Metal Artifact Reduction in CT", In *Medical Imaging* 2018: Physics of Medical Imaging, volume 10573, page 105733O, International Society for optics and Photonics, 2018, and Wang et al., "Conditional Generative Adversarial Networks for Metal Artifact Reduction in CT Images of the Ear", In *Medical Image Computing and Computer Assisted Intervention (MICCAI)*, 2018, proposed to reduce metal artifacts directly in the CT image domain. The metal artifacts in these works are mild and thus can be effectively reduced by a CNN, However, the present inventors have shown in their experiments that such image domain enhancement is not sufficient for mitigating intense metal shadows.

Figure 12:
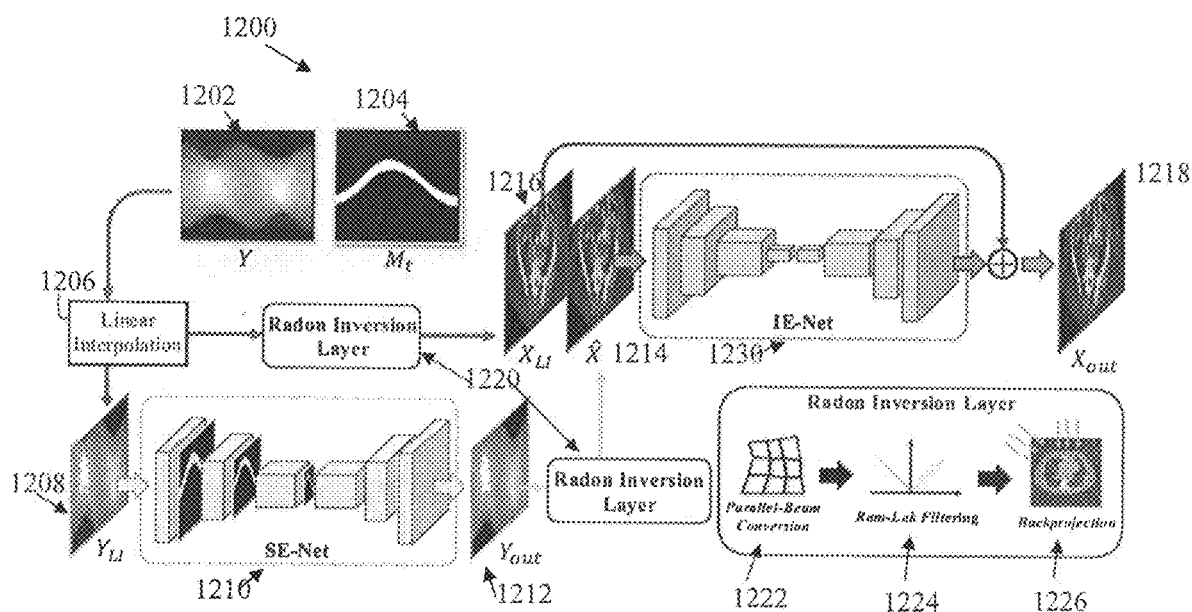
FIG. 12 illustrates a Dual Domain Network (DuDoNet) 1200 for MAR according to an embodiment of the present invention.

FIG. 12 illustrates a Dual Domain Network (DuDoNet) 1200 for MAR according to an embodiment of the present invention. As shown in FIG. 12, the DuDoNet 1200 includes a sinogram enhancement network (SE-Net) 1210, a Radon inversion layer (RIL) 1220, and an image enhancement network (IE-Net) 1230. Inputs to the DuDoNet 1200 include a degraded sinogram $y \in \mathbb{R}^{H_s \times W_s}$ 1202 and the corresponding metal trace mask $M_t \in \{0,1\}^{H_s \times W_s}$ 1204. $H_s$ represents the detector size and $W_s$ represents the number of projection views: The region where $M_t=1$ is the metal trace. Given the input sinogram 1202 and metal trace mask 1204, linear interpolation 1206 is applied to generate an initial estimate for the sinogram data within the metal trace. The resulting interpolated sinogram $Y_{LI}$ 1208 is input both the SE-Net 1210 and the RIL 1220. According to an advantageous embodiment, the SE-Net 1210 then restores $Y_{LI}$ 1208 within the metal trace through a mask pyramid U-Net architecture and outputs a restored sinogram $Y_{out}$ 1212. To maintain sinogram consistency, embodiments of the present invention utilize a Radon consistency (RC) loss for training. A sinogram will be penalized by the RC loss if it leads to secondary artifacts in the image domain after passing through the RIL 1220. The RIL 1220 generates a reconstructed CT image $\hat{X} \in \mathbb{R}^{H_c \times W_c}$ 1214 from the restored sinogram $Y_{out}$ 1212 and also generates a reconstructed CT image $X_{LI}$ 1216 from the interpolated sinogram $Y_{LI}$ 1208. The reconstructed CT image $\hat{X}$ 1214 is refined by the IE-Net 1230 via residual learning, and then combined with the reconstructed CT image $X_{LI}$ 1216 to generate the output reduced metal artifact CT image $X_{out}$ 1218.

The SE-Net 1210 is a DNN that performs enhancement of the linearly interpolated sinogram $Y_{LI}$ 1208. Sinogram enhancement is extremely challenging since geometric consistency should be retained to prevent secondary artifacts in the reconstructed CT image, so it is advantageous to only replace data within the metal trace. Accordingly, given a metal-corrupted sinogram Y 1202 and a metal trace mask $M_t$ 1204, the SE-Net $\mathcal{G}_s$ 1210 is trained to restore the region of $Y_{LI}$ 1208 in $M_t=1$. In sinogram domain enhancement, when the metal trace is small, information about the metal trace is dominated by non-metal regions in higher layers of the network due to down-sampling. In an advantageous embodiment of the present invention, to retain the mask information, the SE-Net $\mathcal{G}_s$ 1210 utilizes a mask pyramid U-Net architecture to fuse the metal trace mask $M_t$ 1204. The output of the SE-Net 1210 is expressed as:

$$Y_{out}=M_t \odot \mathcal{G}_s(Y_{LI}, M_t)+(1-M_t) \odot Y_{LI}. \qquad (6)$$

In an advantageous implementation, an $L_1$ is used to train the SE-Net 1210:

$$L_{G_s}=\|Y_{out}-Y_{gt}\|_1, \qquad (7)$$

where $Y_{gt}$ is a ground truth sinogram used for training.

Although sinogram inconsistency is reduced by the SE-Net 1210, there is no existing mechanism in prior works to penalize secondary artifacts in the image domain. The present inventors have determined that an efficient and differentiable reconstruction layer is advantageous for this purpose. Accordingly, embodiments of the present invention utilize a novel RIL $f_R$ 1220 to reconstruct CT images from sinograms and at the same time allow back-propagation of gradients for end-to-end training of the SE-Net 1210 together with the IE-Net 1230. It should be noted that trivially inverting the projection process $\mathcal{P}$ in existing deep learning frameworks would require a time and space complexity of $\mathcal{O}(H_s\ W_s\ H_c\ W_c)$, which is prohibitive due to limited GPU memory.

According to an advantageous embodiment, we consider the projection process $\mathcal{P}$ as the Radon transform under fan-beam geometry with arc detectors. The distance between an X-ray source and its rotation center is D. The resulting fan-beam sinograms $Y_{fan}$ are represented in coordinates ($\gamma$, $\beta$). To reconstruct CT images from $Y_{fan}(\gamma, \beta)$, the fan-beam filtered back-projection algorithm is used as the forward operation of the RIL 1220.

As shown in FIG. 12, the RIL 1220 includes three modules: a parallel-beam conversion model module 1222, a filtering module 1224, and a back-projection module 1226. The parallel-beam conversion module 1222 transforms $Y_{fan}(\gamma, \beta)$ to its parallel-beam counterpart $Y_{para}(t; \theta)$ through a change of variables. The FBP algorithm in coordinates (t, $\theta$) becomes more effective and memory-efficient than in ($\gamma$, $\beta$). Parallel-beam FBP is then realized by the subsequent filtering and back-projection modules 1224 and 1226.

The parallel-beam conversion module 1222 converts a fan beam sinogram $Y_{fan}(\gamma, \beta)$ to its counterpart parallel-beam sinogram $Y_{para}(t, \theta)$ through the following change of variables:

$$\begin{cases} t = D \sin \gamma \\ \theta = \beta + \gamma \end{cases} \quad (8)$$

The change of variable in Equation (8) is implemented by grid sampling in (t, $\theta$), which allows back-propagation of gradients. From the resulting parallel-beam sinogram $Y_{para}$, CT images can be reconstructed using Ram-Lek filtering and back-projection by the filtering and back-projection modules 1224 and 1226.

In advantageous embodiment, the filtering module 1224 applies Ram-Lak filtering to the parallel-beam sinogram $Y_{para}$ in the Fourier domain, resulting in a filtered parallel-beam sinogram:

$$Q(t,\theta) = \mathcal{F}_t^{-1}\{|\omega| \cdot \mathcal{F}_t\{(Y_{para}(t,\theta)\}\}, \quad (9)$$

where $\mathcal{F}_t$ and $\mathcal{F}_t^{-1}$ are the Discrete Fourier Transform (DFT) and inverse Discrete Fourier Transform (iDFT) with respect to the detector dimension.

The back-projection module 1226 back-projects the filtered parallel-beam sinogram Q to the image domain for every projection angle $\theta$ by the following formula:

$$X(u,v) = \partial_0^\pi Q(u \cos \theta + v \sin \theta, \theta) d\theta, \quad (10)$$

It is clear from Equation (10) that the computation is highly parallel. Due to the back-projection nature of the RIL $f_R$ 1220 describe herein, the derivative with respect to the input $Y_{out}$ 1212 is actually the projection operation $\mathcal{P}$. That is, any loss in the image domain will be aggregated and projected to the sinogram domain. This desirable property enables joint learning in the sinogram and image domains.

As shown in FIG. 12, the RIL 1220 $f_R$ generates the reconstructed CT image $\hat{X}$ 1214 from the restored sinogram $Y_{out}$ 1212. With the differentiable RIL 1220, embodiments of the present invention introduce the following Radon consistency (RC) loss to penalize secondary artifacts in $\hat{X} = f_R (Y_{out})$ after reconstruction:

$$L_{RC} = \|f_R(Y_{out}) - X_{gt}\|_1, \quad (11)$$

where $X_{gt}$ is a ground truth CT image used for training.

The RIL 1220 described herein is designed to combine the image formation process (CT reconstruction) with deep neural networks (SE-Net 1210 and IE-Net 1230) and achieve improved MAR using dual-domain consistency learning. This is not the same as other methods that target image formation itself via deep learning.

The IE-Net 1230 is a DNN that inputs the reconstructed CT image $\hat{X}$ 1214 generated from the restored sinogram $Y_{out}$ 1212 and the reconstructed CT image $X_{LI}$ 1216 generated directly from the interpolated sinogram $Y_{LI}$ 1208, and outputs the reduced metal artifact CT image $X_{out}$ 1218. The reconstructed CT image 1214 is refined by the IE-Net 1230 via residual learning, and then combined with the reconstructed CT image $X_{LI}$ 1216 to generate the output reduced metal artifact CT image $X_{out}$ 1218. IE-Net 1230 can be implemented as a U-Net (or other deep image-to-image network) $G_i$, which enhances the reconstructed CT image $\hat{X}$ 1214 by residual learning to reduce visually undesirable artifacts in the image domain:

$$X_{out} = X_{LI} + G_i(\hat{X}, X_{LI}), \quad (12)$$

where $X_{LI} = f_R(Y_{LI})$ is reconstructed from $Y_{LI}$ 1208, the linearly interpolated sinogram. IE-Net $G_i$ 1230 is also optimized by $L_1$ loss during training:

$$L_{G_i} = \|X_{out} - X_{gt}\|_1, \quad (13)$$

where $X_{gt}$ is a ground truth CT image used for training. According to an advantageous embodiment of the present invention, the dual-dual domain network 1200 is trained together end-to-end. That is, the SE-Net 1210 and the IE-Net 1230 are trained together end-to-end, Since, as described above, the RIL 1220 is differentiable and gradients can be back-propagated through the RIL 1220 from the IE-Net 1230 to the SE-Net 1210, gradient descent back-propagation training can be used to simultaneously train (optimize weights) the SE-Net 1210 and IE-Net 1230 to minimize a combine objective/loss function. The combined objective function is:

$$L = L_{G_s} + L_{RC} + L_{G_i}, \quad (14)$$

The objective function combines the SE-Net loss $L_{G_s}$, the RC loss, and the IE-Net loss $L_{G_i}$. It is possible to assign weights to these terms to tune the relative strengths of the three loss values. However, in an exemplary implementation, the present inventors have determined that the default setting in Equation (14) of equally weighted loss terms provides excellent results for CT metal artifact reduction. During training, a set of training samples for $Y_{LI}$ 1208 and $X_{LI}$ 1216 are Collected/generated with corresponding ground truth restored sinograms $Y_{out}$ and ground truth reduced metal artifact CT images $X_{out}$ 1218. Gradient descent backpropagation is used to train the SE-Net 1230 and IE-Net 1210 to minimize the combined objective, function in Equation (14) over the set of training data.

Figure 13:
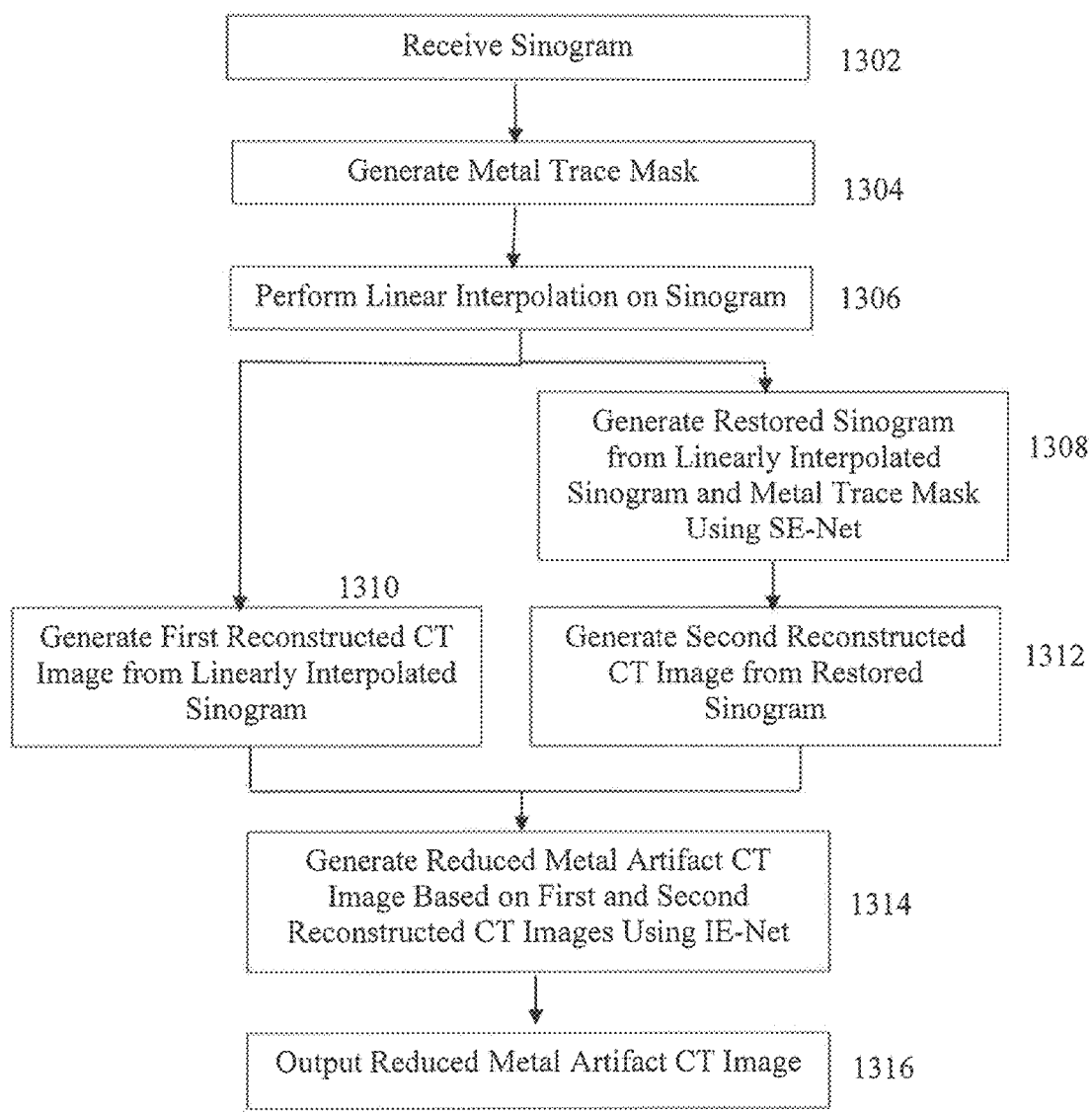
FIG. 13 illustrates a method of CT image formation and CT metal artifact reduction using a dual-domain network according to an embodiment of the present invention.

FIG. 13 illustrates a method of CT image formation and CT metal artifact reduction using a dual-domain network according to an embodiment of the present invention. The method of FIG. 13 will be described with reference to the DuDoNet 1200 of FIG. 12. At step 1302, a sinogram Y 1202 is received. The sinogram Y 1202 can be received is received from a sensor of a CT image acquisition device. At step 1304, a metal trace mask $M_t$ 1204 is generated from the sinogram Y 1202. The metal trace mask $M_t$ 1204 can be generated by performing a thresholding operation on the sinogram Y 1202, At step 1306, linear interpolation is performed on the sinogram Y 1202, resulting in a linearly interpolated sinogram $Y_{LI}$ 1208.

At step 1308, a restored sinogram $Y_{out}$ 1212 is generated from the linearly interpolated sinogram $Y_{LI}$ 1208 and the metal trace mask $M_t$ 1204 using the SE-Net 1210. The SE-Net 1210 inputs the linearly interpolated sinogram $Y_{LI}$ 1208 and the metal trace mask $M_t$ 1204 and generates the restored sinogram $Y_{out}$ 1212, which refines sinogram data of the linearly interpolated sinogram $Y_{LI}$ 1208 within the metal trace $M_t$ 1204.

At step 1310, a first reconstructed CT image $X_{LI}$ 1216 is generated from the linearly interpolated sinogram $Y_{LI}$ 1208. The RIL 1220 inputs the linearly interpolated sinogram $Y_{LI}$ 1208 and reconstructs the first reconstructed CT image $X_{LI}$ 1216. In particular, in an advantageous embodiment, the parallel-beam conversion module 1222 converts the fan-beam linearly interpolated sinogram $Y_{LI}$ 1208 to a parallel-beam sinogram. The filtering module 1224 then performs Ram-Lak filtering to the parallel-beam sinogram, and the back projection module 1226 back-projects the filtered parallel-beam sinogram to the image domain, resulting in the first reconstructed CT image $X_{LI}$ 1216.

At step 1312, a second reconstructed CT image $\hat{X}$ 1214 is generated from the restored sinogram $Y_{out}$ 1212. The RIL 1220 inputs the restored sinogram $Y_{out}$ 1212 generated by the SE-Net 1210 and reconstructs the second reconstructed CT image $\hat{X}$ 1214. In particular, in an advantageous embodiment, the parallel-beam conversion module 1222 converts the fan-beam restored sinogram $Y_{out}$ 1212 to a parallel-beam sinogram. The filtering module 1224 then performs Ram-Lak filtering to the parallel-beam sinogram, and the back-projection module 1226 back-projects the filtered parallel-beam sinogram to the image domain, resulting in the second reconstructed CT image $\hat{X}$ 1214.

At step 1314, a reduced metal artifact CT image $X_{out}$ 1218 is generated based on the first and second reconstructed CT images $X_{LI}$ 1216 and $\hat{X}$ 1214, respectively, using the IE-Net 1230. The IE-Net inputs the first reconstructed CT image $X_{LI}$ 1216 reconstructed from the linearly interpolated sinogram $Y_{LI}$ 1208 and the second reconstructed CT image $\hat{X}$ 1214 reconstructed from the restored sinogram $Y_{out}$ 1212, and generates the reduced metal artifact CT image $X_{out}$ 1218. The IE-Net 1230 applies residual learning to refine/enhance the second reconstructed CT image $\hat{X}$ 1214 and then combine it with the first reconstructed CT image $X_{LI}$ 1216 to generate the reduced metal artifact CT image $X_{out}$ 1218.

At step 1316, the reduced metal artifact CT image $X_{out}$ 1218 is output. The reduced metal artifact CT image $X_{out}$ 1218 can be output by displaying the reduced metal artifact CT image $X_{out}$ 1218 on a display device. The display device can be part of the CT acquisition device or a display device of another computer system.

Figure 14:
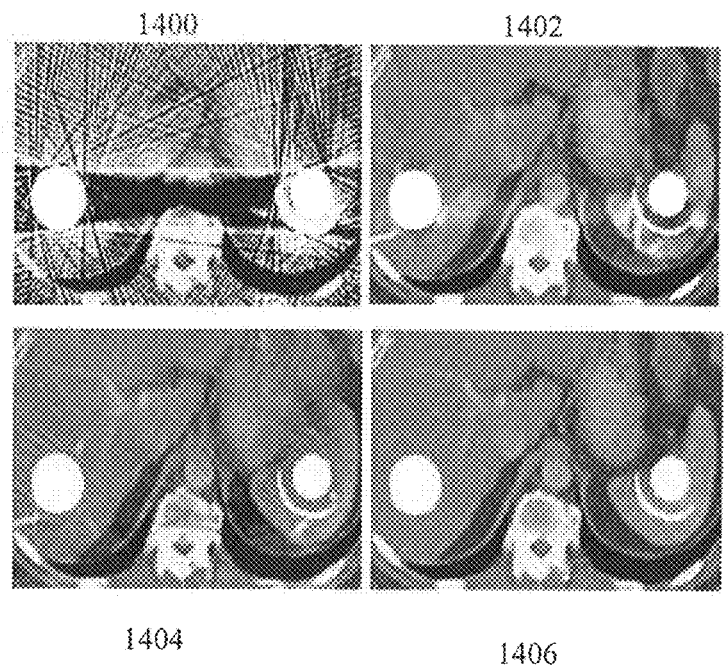
FIG. 14 illustrates exemplary CT metal artifact reduction results.

FIG. 14 illustrates exemplary CT metal artifact reduction results. As shown in FIG. 14, image 1400 is a CT image with intense metal artifacts, Metal implants can be observed as circular shapes on both sides of image 1400. Images 1402 and 1404 show MAR results from other existing techniques. In image 1402, metal implants are not fully reduced and a white band is present between the two implants. In image 1404, organ boundaries on the right side of the image are smeared out, Image 1406 shows MAR results generated using the DuDoNet according to an embodiment of the present invention. As can be observed in image 1406, the DuDoNet method effectively reduces metal shadows and recovers fine details.

Evaluations of the effectiveness of CT metal artifact reduction using the method of FIG. 13 were performed using simulated metal artifacts on real patient CT images. In the simulation, various effects were considered, including polychromatic X-ray, partial volume effect, and Poisson noise. The simulated artifacts exhibit complicated structures and cannot be easily modeled by a very deep convolutional neural network (CNN). Various existing approaches were compared by evaluating them on the same dataset, and the DuDoNet method described herein achieved superior performance to the existing approaches.

A large-scale CT dataset "DeepLesion" for lesion detection was recently released. Due to its high diversity and quality, a subset of images from DeepLesion was used to synthesize metal artifacts. 4,000 images from 320 patients were used in the training set and 200 images from 12 patients were used in the test set. All of the images were resized to 416×416. A total of 100 metal shapes were collected. 90 metal shapes are paired with the 4,000 images, yielding 360,000 combinations in the training set, 10 metal shapes are paired with the 200 images, yielding 2,000 combinations in the test set. In the training set, the sizes of the metal implants range from 32 to 2054 pixels.

Figure 15:
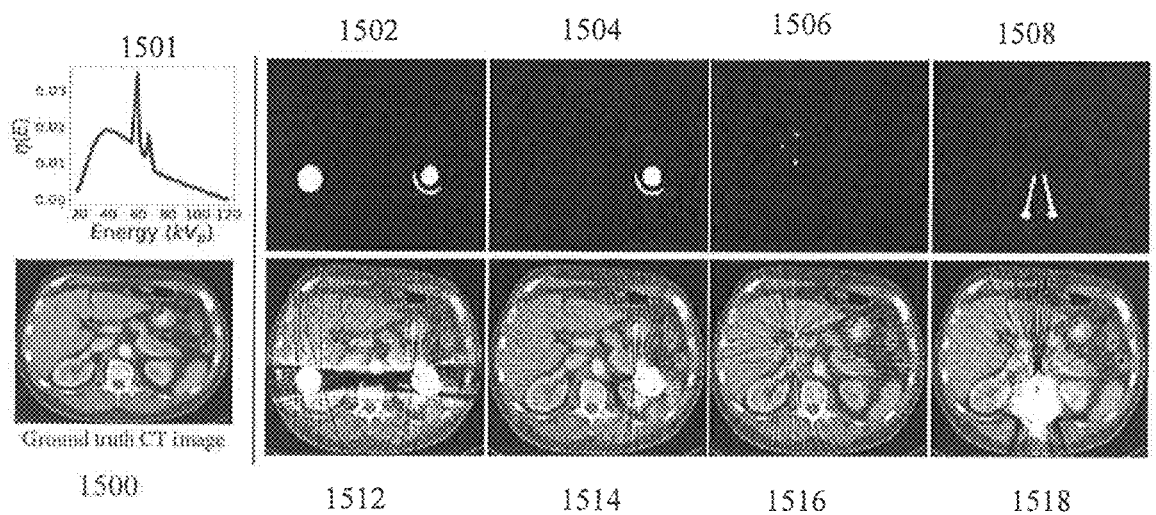
FIG. 15 illustrates exemplary sample CT images with simulated metal artifacts.

To synthesize metal-corrupted sinograms and CT images, a polychromatic X-ray source was assumed, with an X-ray spectrum $\eta(E)$ 1501 shown in FIG. 15. To simulate Poisson noise in the sinogram, it was assumed that the incident X-ray has $2 \times 10^7$ photons. Metal partial volume effect was also considered. The distance from the X-ray source to the rotation center was set to 39.7 cm, and 320 projection views were uniformly spaced between 0-360 degrees. The resulting sinograms have a size of 321×320. FIG. 15 illustrates exemplary sample simulated metal artifacts on CT images. FIG. 15 illustrates exemplary sample CT images with simulated metal artifacts. As shown in FIG. 15, image 1500 is a ground truth CT image. Images 1502, 1504, 1506, and 1508 show metal implant shapes and images 1512, 1514, 1516, and 1518 show simulated metal artifacts on the ground truth CT image 1500 from the metal implant shapes 1502, 1504, 1506, and 1508, respectively.

Peak signal-to-noise ratio (PSNR) and structured similarity index (SSIM) were selected for quantitative evaluations. In DeepLesion, each CT image is provided with a dynamic range, within which the tissues are clearly discernable. This dynamic range was used as the peak signal strength when calculating PSNR.

For evaluation purposes, the DuDoNet model was implanted using the PyTorch framework described in Paszke et al., "Automatic Differentiation in Pytorch", In *NIPS-W*, 2017, which is incorporated herein by reference in its entirety. All the sinograms have size 321×320 and all the CT images have size 416×416. To train the model, the Adam optimizer described in Kingma et al., "Adam: A Method for Stochastic Optimization", arXiv preprint arXiv: 1412.6980, 2014 was used, with $(\beta_1, \beta_2)=(0.5, 0.999)$ and a batch size of 8. The learning rate starts from $2 \times 10^{-4}$, and is halved for every 30 epochs. The model was trained on two Nvidia 1080Ti for 380 epochs.

Tests were performed to evaluate the effectiveness of different components of the proposed DuDoNet approach. Performance level was evaluated on the artifact-reduced CT images. When evaluating SE-Nets without image domain refinement, the reconstructed CT images $\hat{X}$ were used. Experiments were performed on the following configurations: A) SE-Net$_0$—The sinogram enhancement network without the mask pyramid network; B) SE-Net—The full sinogram enhancement module; B) IE-Net—Image enhancement module. IE-Net is applied to enhance $X_{LI}$ without $\hat{X}$; D) SE-Net$_0$+IE-Net—Dual domain learning with SE-Net$_0$ and IE-Net; E) SE-Net+IE-Net—Dual domain learning with SE-Net and IE-Net; F) SE-Net$_0$+IE-Net+RCL—Dual domain learning with Radon consistency loss; and G) SE-Net$_0$+IE-Net+RCL—The full dual domain learning network described above. The configurations SE-Net$_0$, SE-Net, and IE-Net are single domain approaches.

Table 1 summarizes the performance of the different model configurations. Since there are only 10 metal implants in the test set, for conciseness, the results were grouped according to the size of the metal implants. The size of the 10 metal implants are [2054, 879, 878, 448, 242, 115, 115, 111, 53, and 32] in pixels. Two masks were put in every group.

TABLE 1

Quantitative evaluations for different components in DuDoNet.

| PSNR(dB)/SSIM | Large Metal → Small Metal | | | | | Average |
|---|---|---|---|---|---|---|
| A) SE-Net$_a$ | 22.88/0.7850 | 24.52/0.8159 | 27.38/0.8438 | 28.61/0.8549 | 28.93/0.8581 | 28.93/0.8315 |
| B) SE-Net | 23.06/0.7808 | 24.71/0.8178 | 27.66/0.8463 | 28.91/0.8575 | 29.19/0.8604 | 26.71/0.8337 |
| C) IE-Net | 27.54/0.8840 | 29.49/0.9153 | 31.96/0.9368 | 34.38/0.9498 | 33.90/0.9489 | 31.45/0.9269 |
| D) SE-Net$_a$ + IE-Net | 28.46/0.8938 | 30.67/0.9232 | 33.71/0.9458 | 36.17/0.9576 | 35.74/0.9571 | 32.95/0.9353 |
| E) SE-Net + IE-Net | 28.28/0.8921 | 30.49/0.9221 | 33.76/0.9456 | 36.26/0.9576 | 36.01/0.9574 | 32.96/0.9450 |
| F) SE-Net$_a$ + IE-Net + RCL | 28.97/0.8970 | 31.14/0.9254 | 34.21/0.9476 | 36.58/0.9590 | 36.15/0.9586 | 33.41/0.9375 |
| G) SE-Net + IE-Net + RCL | 29.02/0.8972 | 31.12/0.9256 | 34.32/0.9481 | 36.72/0.9395 | 36.36/0.9592 | 33.51/0.9379 |

Figure 16:
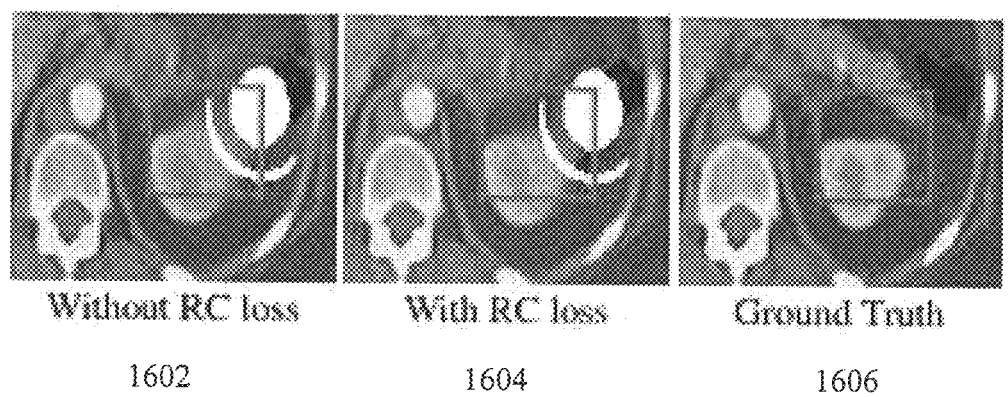
FIG. 16 illustrates visual comparisons between DuDoNet configurations with and without RC loss.

From E and G in Table 1, it is clear that the use of the RC loss improves the performance over all metal sizes for at least 0.3 dB. FIG. 16 illustrates visual comparisons between DuDoNet configurations with and without RC loss. As shown in FIG. 16, image 1602 shows a reduced metal artifact CT image generated using the DuDoNet without RC loss (E in Table 1), image 1604 shows a reduced metal artifact CT image generated using the full DuDoNet model with RC loss (G in Table 1), and image 1606 is the ground truth CT image. As can be seen in FIG. 16, the model configuration trained with the RC loss better recovers the shape of the organ.

Figure 17:
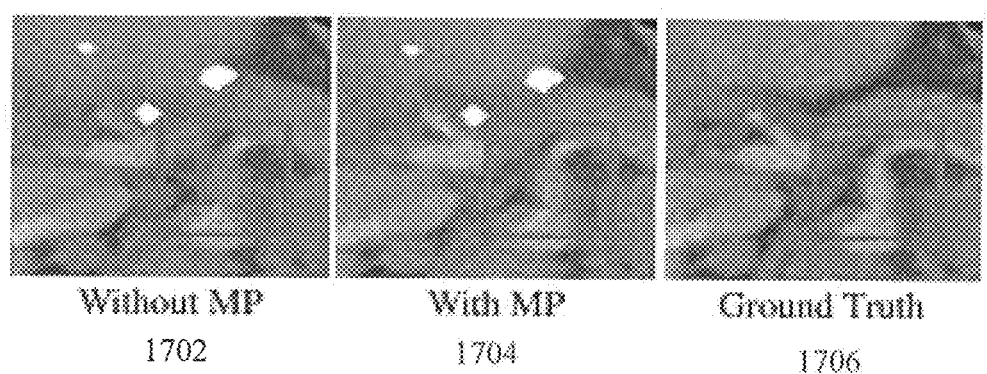
FIG. 17 illustrates visual comparisons between DuDoNet model configurations with and without the mask pyramid SE-Net.

From F and G in Table 1, an interesting trend can be observed in which the proposed mask pyramid for the SE-Net results in ~0.2 dB gain when the metal size is small, and the performance is nearly identical when the metal is large. The reason is that the mask pyramid retains metal information across multiple scales. FIG. 17 illustrates visual comparisons between DuDoNet model configurations with and with the mask pyramid SE-Net. As shown in FIG. 17, image 1702 shows a reduced metal artifact CT image generated using the DuDoNet without the mask pyramid network (F in Table 1), image 1704 shows a reduced metal artifact CT image generated using the full DuDoNet model including the mask pyramid network (G in Table 1), and image 1706 is the ground truth CT image. FIG. 17 demonstrates that in the proximity of small metal implants, the model with the mask pyramid recovers the fine details.

Figure 18:
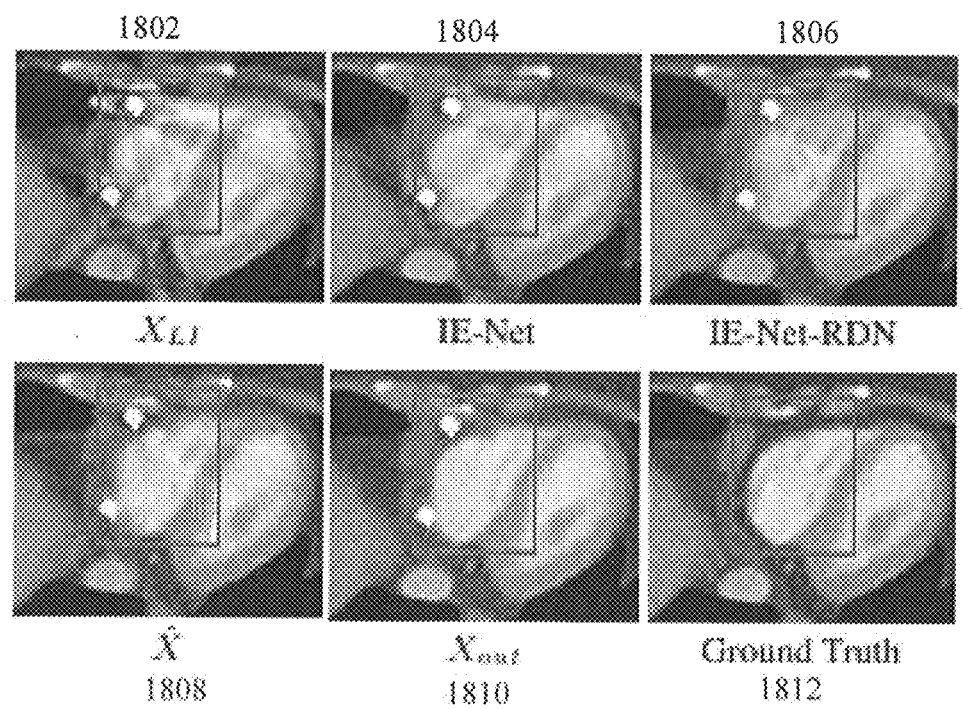
FIG. 18 illustrates visual comparisons between single domain networks without SE-Net and the full DuDoNet model.

In proposed DuDoNet framework, IE-Net enhances $X_{LI}$ by fusing information from SE-Net. The effect of dual domain learning can be observed by visually comparing results from the full, DuDoNet model (G in Table 1) with single domain enhancement IE-Net (C in Table 1). In addition to the U-net architecture of IE-Net described above, IE-Net with a Residual Dense Network (RSD), which is denoted as IE-NET-ISDN, is also considered. FIG. 18 illustrates visual comparisons between single domain networks without SE-Net and the full DuDoNet model. As shown in FIG. 18, image 1802 shows the CT image $X_{LI}$ reconstructed from the linearly interpolated sinogram, image 1804 shows a reduced metal artifact CT image generated from $X_{LI}$ 1802 using IE-Net without SE-Net (C in Table 1), and image 1806 shows a reduced metal artifact CT image generated from $X_{LI}$ 1802 using IE-Net-RDN without SE-Net. Image 1808 shows the CT image $\hat{X}$ reconstructed from the restored sinogram generated by the SE-Net, and image 1810 shows the reduced metal artifact CT image $X_{out}$ generated by the full DuDoNet (G in Table 1), Image 1812 is the ground truth CT image. It can be observed in FIG. 18 that the single domain models IE-Net and IE-Net-RDN fail to recover the corrupted organ boundaries in $X_{LI}$ 1802. In the dual domain refinement network, SE-Net first recovers inconsistent sinograms and reduces secondary artifacts, as can be seen in X 1808. IE-Net then refines X 1802 to recover fine details.

The inputs to the DuDoNet described herein are the linear interpolated sinogram $Y_{LI}$ and its reconstructed CT $X_{LI}$. A possible alternative is to directly input the metal corrupted sinogram and CT and let the network learn to restore the intense artifacts. However, the present inventors have determined experimentally that the DuDoNet performs better using the linearly interpolated inputs, as described above.

The performance of the DuDoNet model described herein was compared with the following methods: LI (Kalender et al., "Reduction of CT Artifacts Caused by Metallic Implants", *Radiology*, 164(2):578-577, 1987); NMAR (Meyer et al., "Normalized Metal Artifact Reduction (NMAR) in Computed Tomography," *Medical physics*, 37(10):5482-5493, 2010); cGAN-CT (Wang et al., "Conditional Generative Adversarial Networks for Metal Artifact Reduction in CT Images of the Ear," In *Medical Image Computing and Computer Assisted Intervention (MICCAI)*, 2018); RDN-CT (Zhang et al., "Residual Dense Network for Image Super-Resolution," In The *IEEE Conference on Computer Vision and Pattern Recognition (CVPR)*, 2018); and CNNMAR (Zhang et al, "Convolutional Neural Network Based Metal Artifact Reduction in X-ray Computed Tomography," *IEEE Transactions on Medical Imaging*, 2018). RDN was originally proposed for image super-resolution (SR). The fundamental building unit of RDN is the residual dense block (RDB). Recently, it has been shown that by stacking multiple RDBs or its variant, the residual in residual dense blocks (RRDBs), local details in natural images can be effectively recovered. A very deep architecture with 10 RDBs (~80 conv layers) was built for direct image domain enhancement, which is denoted by RDN-CT. Specifically, the values of D=10, C=8, G=64 were selected, and inputs to the RDN-CT are 128×128 patches.

Table 2 shows quantitative comparisons between DuDoNet and the various other methods. In can be observed that the state-of-the-art sinogram inpainting approach CNNMAR achieves higher SSIM than image enhancement approaches (e.g., RDN and cGAN-CT), especially when the size of the metal is small. The reason is that sinogram inpainting only modifies data within the metal trace and recovers the statistics reasonably well. In most cases, CNN-MAR also outperforms cGAN-CT in terms of PSNR. However, when the CNN is sufficiently deep (e.g., RDN-CT), image enhancement approaches generally achieve higher PSNR. The dual domain learning approach described herein jointly restores sinograms and CT images, which attains the best performance in terms of both PSNR and SSIM consistently in all categories.

TABLE 2

Quantitative evaluation of MAR approaches in terms of PSNR and SSIM

| PSNR(dB)/SSIM | Large Metal → Small Metal | | | | | Average |
|---|---|---|---|---|---|---|
| LI | 20.20/0.8236 | 22.35/0.8658 | 36.76/0.9098 | 28.50/0.9252 | 29.53/0.9312 | 25.47/0.8917 |
| NMAR | 21.95/0.8333 | 24.43/0.8813 | 28.63/0.9174 | 30.84/0.9281 | 31.69/0.9492 | 37.51/0.9601 |
| cGAN-CT | 26.71/0.8265 | 24.71/0.8507 | 29.80/0.8911 | 31.47/0.9104 | 27.65/0.8876 | 28.97/0.8773 |
| RDN-CT | 28.61/0.8668 | 28.78/0.9927 | 32.40/0.9244 | 34.95/0.9446 | 34.06/0.9376 | 31.74/0.9136 |
| CNNMAR | 23.82/0.8690 | 26.78/0.9097 | 30.92/0.9394 | 32.97/0.9513 | 33.11/0.9529 | 29.52/0.9243 |
| DuDoNet (Ours) | 29.02/0.8972 | 31.12/0.9256 | 34.32/0.9481 | 36.72/0.9595 | 36.36/0.9592 | 33.51/0.9379 |

Figure 19:
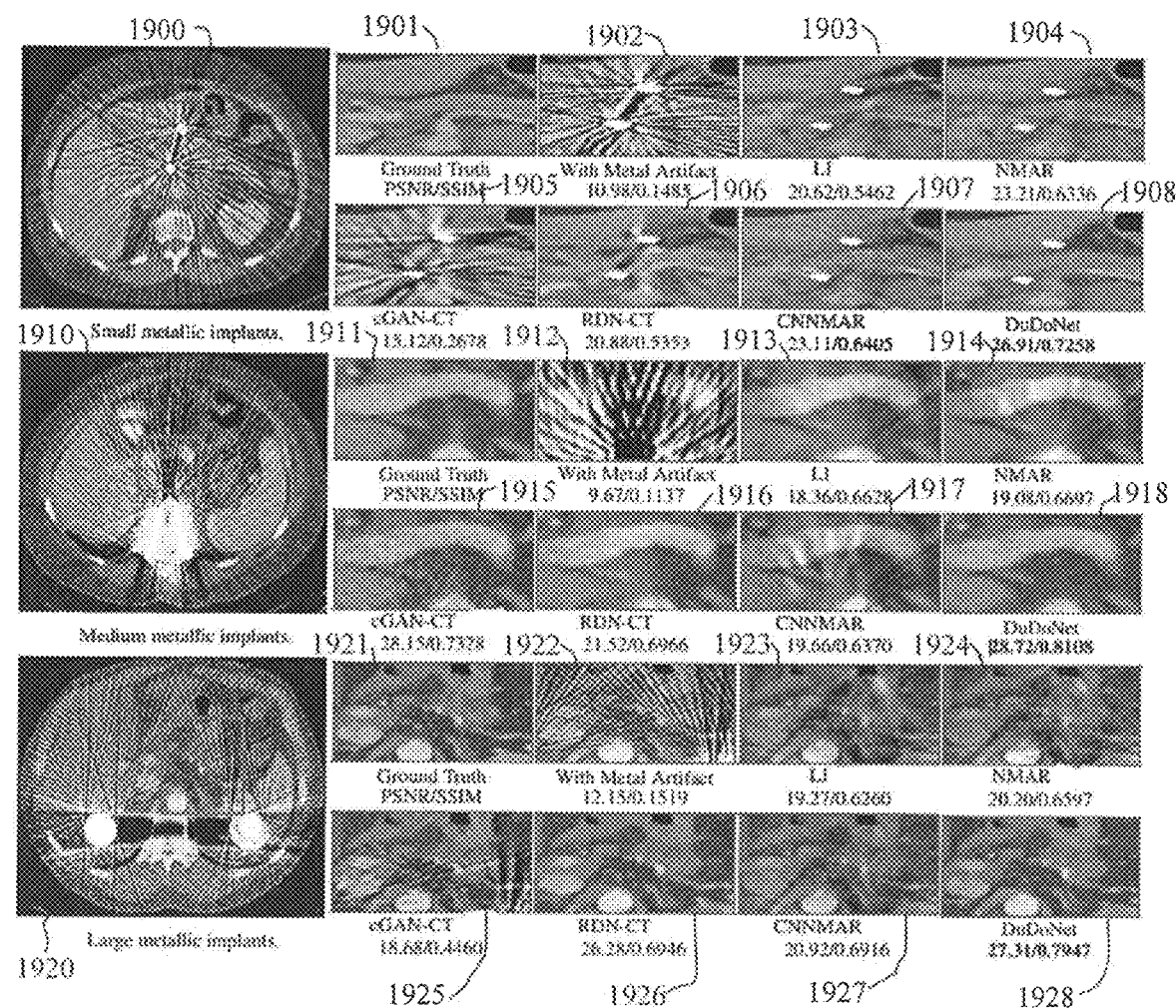
FIG. 19 illustrates visual comparisons of various metal artifact reduction techniques for different types of metal implants.

FIG. 19 illustrates visual comparisons of various metal artifact reduction techniques for different types of metal implants. As shown in FIG. 19, image 1900 shows CT image with metal artifacts caused by small metallic implants. Image 1901 shows a ground truth CT image corresponding to boxed region in image 1900 and image 1902 shows the metallic artifacts in the boxed region in image 1900. Images 1903, 1904, 1905, 1906, 1907, and 1908 show reduced metal artifact CT images generated by LI, NMAR, cGAN-CT, RDN-CT, CNNMAR, and DuDoNet, respectively, for the boxed region of image 1900. Image 1910 shows CT image with metal artifacts caused by medium metallic implants, Image 1911 shows a ground truth CT image corresponding to boxed region in image 1910 and image 1912 shows the metallic artifacts in the boxed region in image 1910. Images 1913, 1914, 1915, 1916, 1917, and 1918 show reduced metal artifact CT images generated by LI, NMAR, cGAN-CT, RDN-CT, CNNMAR, and DuDoNet, respectively, for the boxed region of image 1910. Image 1920 shows CT image with metal artifacts caused by large metallic implants. Image 1921 shows a ground truth CT image corresponding to boxed region in image 1920 and image 1922 shows the metallic artifacts in the boxed region in image 1920. Images 1923, 1924, 1925, 1926, 1927, and 1928 show reduced metal artifact CT images generated by LI, NMAR, cGAN-CT, RDN-CT, CNNMAR, and DuDoNet, respectively, for the boxed region of image 1920.

Images 1900-1908 of FIG. consider MAR for metallic artifacts caused by small metallic implants. In image 1902 of FIG. 19, severe streaking artifacts and intense metal shadows can be perceived between the two implants. It is observed that, for small metallic implants, the sinogram inpainting approaches, such as LI 1903, NMAR 1904, and CNNMAR 1907 effectively reduce metal shadows. However, fine details are either corrupted by secondary artifacts, as in LI 1903, or blurred, as in NMAR 1904 and SNNMAR 1907. Image domain approaches, such as cGAN-CT 1905 and RDN-CT 1906 produce sharper CT image's but fail to suppress metal shadows. The DuDoNet method 1908, effectively reduces metal shadows and at the same time retains fine details. Images 1910-1918 consider metal artifacts caused by medium metallic implants. Image 1910 shows a degraded CT image with long metal implants. A similar trend is observed in which the sinogram inpainting approaches do not perform well in regions with intense streaking artifacts. In this example, the image domain methods reduce most of the artifacts. This is possibly due to the fact that the pattern of the artifact in image 1910 is monotonous as compared to the artifacts in images 1900 and 1920. However, noticeable speckle noise is present in the results generated by cGAN-CT 1915 and RDN-CT 1916. Images 1920-1928 consider metal artifacts resulting from two large metallic implants. Likewise, sinogram inpainting methods and direct image domain enhancement have limited capability of suppressing the metal artifacts. As can be observed in FIG. 19, the DuDoNet achieves superior results for MAR for small, medium, and large metallic implants, as compared with the other methods.

On Nividia 1080Ti GPU, it takes 0.24 ms for the RIL to reconstruct a sinogram of size 321×320 to a CT image of size 416×416, and 11.40 ms for back propagation of gradients. The RIL requires 16 MB of memory for forward pass and 25 MB for back-propagation. Table 3 shows a comparison of running time of the different MAR approaches. With the running time of LI included, DuDoNet runs almost 4× faster than the very deep architecture RDN while achieving superior performance.

TABLE 3

Comparison of running time measured in seconds.

| LI | NMAR | cGAN-CT | RDN-CT | CNNMAR | DuDoNet (Ours) |
|---|---|---|---|---|---|
| 0.0832 | 0.4180 | 0.0365 | 0.5150 | 0.6043 | 0.1335 |

In addition to CT MAR, the dual domain network 1000 of FIG. 10 and method of FIG. 11 can be trained to perform various other medical image signal recovery applications. As described above, H-Net architecture 900 of FIG. 9 can be used for either or both of the DNNs 1010 and/or 1030 of the dual domain network 1000, According to further embodiments of the present invention, the H-net architecture 900 can also be used independently of the dual domain framework in either the image domain (the first framework shown in FIG. 5) or the signal sensor domain (the second framework shown in FIG. 6) to perform various medical image signal recovery applications. Even used in a single domain for signal recovery, the H-Net architecture provides improved performance as compared to existing deep image-to-image networks.

Figure 20:
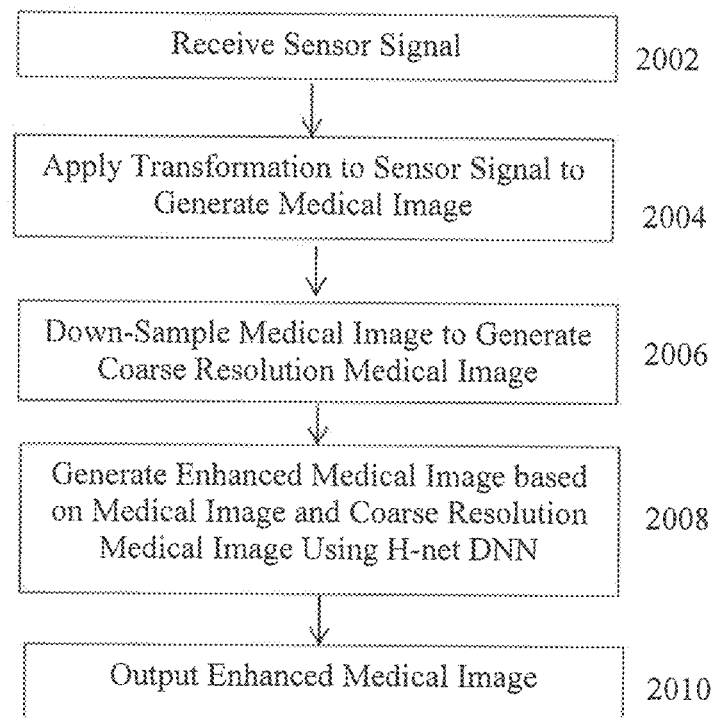
FIG. 20 illustrates a method for medical image formation and signal recovery using an H-Net DNN according to an embodiment of the present invention.

FIG. 20 illustrates a method for medical image formation and signal recovery using an H-Net DNN according to an embodiment of the present invention. The method of FIG. 20 applies the H-net in the image domain and corresponds to the first framework shown in FIG. 5 above. At step 2002, a sensor signal is received. The sensor signal is received from a sensor of a medical image acquisition device, such as a CT or MRI scanner. At step 2004, a transformation is applied to the sensor signal to generate a medical image. For example, for MRI the transformation may be a fast Fourier Transform (FFT) and in CT PET, the sensor signal is a sinogram and the transformation may be a Fourier slice transformation applied to the sinogram. At step 2006, the medical image is down-sampled to generate a coarse resolution medical image. At step 2008, an enhanced medical image is generated based on the medical image and the coarse resolution medical image using an H-net DNN, such as the H-net 900 shown in FIG. 9. In particular, the original resolution medical image is input to the first network 910 of the H-net 900 and the coarse resolution medical image is input to the second network 930 of the H-net. The second network 930 processes the coarse resolution medical image and feature maps generated by encoding stages 932, 934, and 936 of the second network are up-sampled and cropped, and then input to subsequent encoding stages 914, 916, and 918 of the first network 910. The first network 910 processes the original resolution medical image, with encoding layers 914, 916, and 918 also inputting the feature maps generated in the second network 930, and outputs the enhanced medical image which provides a signal recovered medical image. At step 2010, the enhanced medical image is output. For example, the enhanced medical image can be displayed on a display device of the medical image acquisition device or a display device of another computer system.

The method of FIG. 20 can be applied to perform various signal recovery applications for various medical imaging modalities. The method of FIG. 20 may be particularly beneficial for MRI signal recovery applications for which pre-transformation processing in the sensor signal domain provides less of a benefit than in other imaging modalities. For example, the method of FIG. 20 can be used to perform MR fast acquisition in which a full phase MR image is recovered from an under-sampled MR acquisition, MR super-resolution and slice interpolation, and/or recovery of higher-quality (e.g., 8 channel) MR images from lower quality (e.g., 2 channel) MR acquisitions. However, the method of FIG. 20 is not limited to MR signal recovery applications and can be applied to signal recovery in any imaging modality. For example, the method of FIG. 20 can also be applied to applications such as cone beam CT (CBCT) sparse-view reconstruction, X-ray image denoising, and recovering high dose CT images from low dose CT acquisitions.

Figure 21:
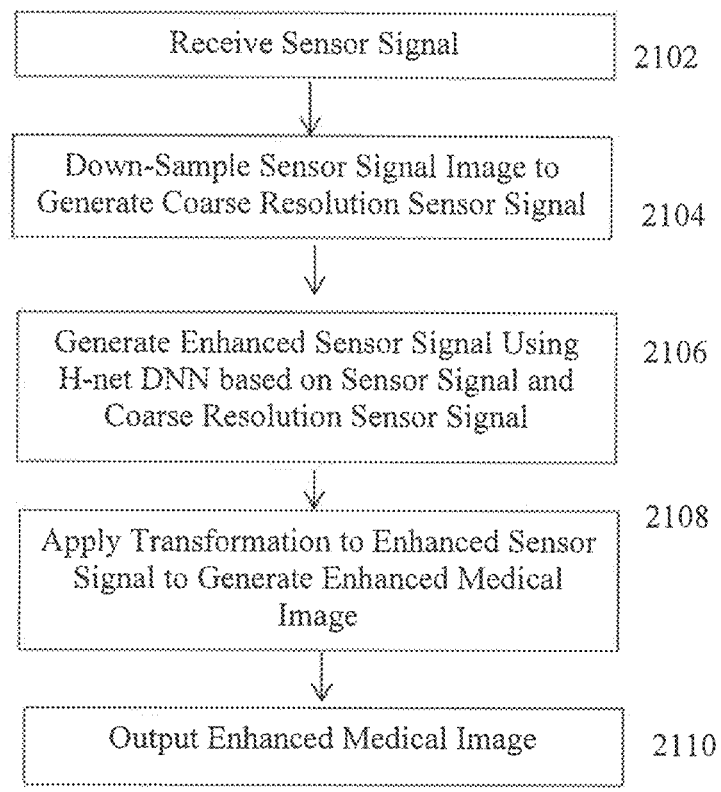
FIG. 21 illustrates a method for medical image formation and signal recovery using an H-Net DNN according to another embodiment of the present invention.

FIG. 21 illustrates a method for medical image formation and signal recovery using an H-Net DNN according to another embodiment of the present invention. The method of FIG. 21, applies the Hornet in the sensor signal domain and corresponds to the second framework shown in FIG. 6 above. At step 2102, a sensor signal is received. The sensor signal is received from a sensor of a medical image acquisition device, such as a CT scanner. In the case of CT image acquisition, the sensor signal is a sinogram. At step 2104, the sensor signal is down-sampled to generate a coarse resolution sensor signal. At step 2106, an enhanced sensor signal is generated based on the sensor signal and the coarse resolution sensor signal using an H-net DNN, such as the H-net 900 shown in FIG. 9. In particular, the original resolution sensor signal is input to the first network 910 of the H-net 900 and the coarse resolution sensor signal is input to the second network 930 of the H-net. The second network 930 processes the coarse resolution sensor signal and feature maps generated by encoding stages 932, 934, and 936 of the second network are ups sampled and cropped, and then input to subsequent encoding stages 914, 916, and 918 of the first network 910. The first network 910 processes the original resolution sensor signal, with encoding layers 914, 916, and 918 also inputting the feature maps generated in the second network 930, and outputs the enhanced sensor signal. At step 2108, a transformation is applied to the enhanced sensor signal to generate an enhanced medical image. At step 2110, the enhanced medical image is output. For example, the enhanced medical image can be displayed on a display device of the medical image acquisition device or a display device of another computer system.

The method of FIG. 21 can be particularly beneficial for signal recovery in medical imaging modalities in which the signal sensor domain provides information that is difficult to model in the image domain, such as CT, Example signal recovery applications that can be performed using the method of PG. 21 include CT artifact reduction, inpainting, CBCT sparse-view reconstruction, X-ray image denoising, and recovering high dose CT images from low dose CT acquisitions, but the present invention is not limited thereto.

Figure 22:
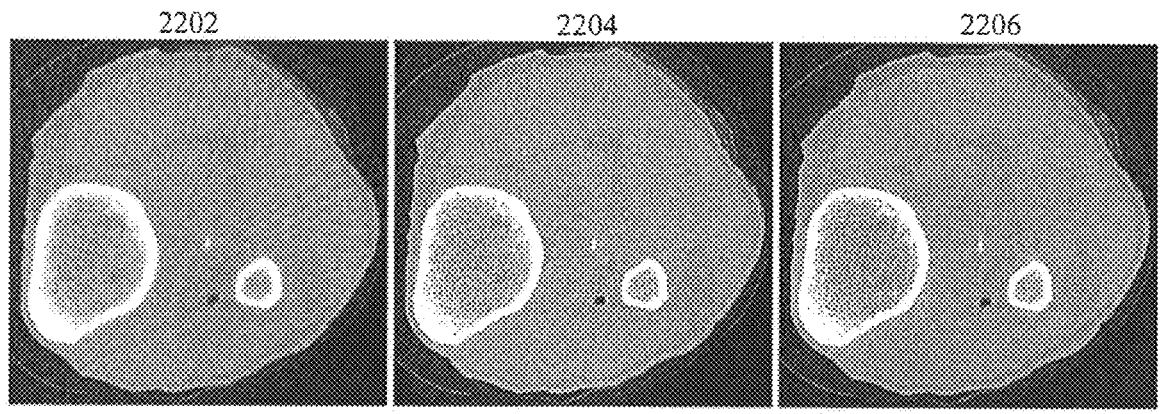
FIG. 22 illustrates exemplary CT/cone beam CT (CBCT) sparse-view reconstruction results.

In exemplary embodiments of the present invention, CT or CBCT sparse-view reconstruction may be performed using the dual domain network method of FIG. 11, the image domain H-net method of FIG. 20, or the sensor signal domain H-net method of FIG. 21. In CT/CBCT sparse-view reconstruction, a sparse-view CT acquisition is performed with a reduced radiation dose, and an enhanced CT image is generated from the sparse-view CT acquisition that attempts to recover a full dose dense view CT image. This results in reduced dose exposure and increased safety for patients. FIG. 22 illustrates exemplary CT/CBCT sparse-view reconstruction results. The CT/CBCT sparse-view reconstruction results shown in FIG. 22 were generated using the image domain H-net method of FIG. 20. As shown in FIG. 22, image 2202 is a sparse-view CT/CBCT image and image 2204 is a ground truth dense-view CT/CBCT image of the same subject. The sparse-view CT image 2202 is generated from a CT/CBCT acquisition with an equivalently reduced radiation dose (e.g., 113 radiation dose) of the dense-view CT/CBCT image 2204. Image 2206 is an enhanced CT/CBCT image recovered from the sparse-view CT/CBCT image 2202.

Figure 23:
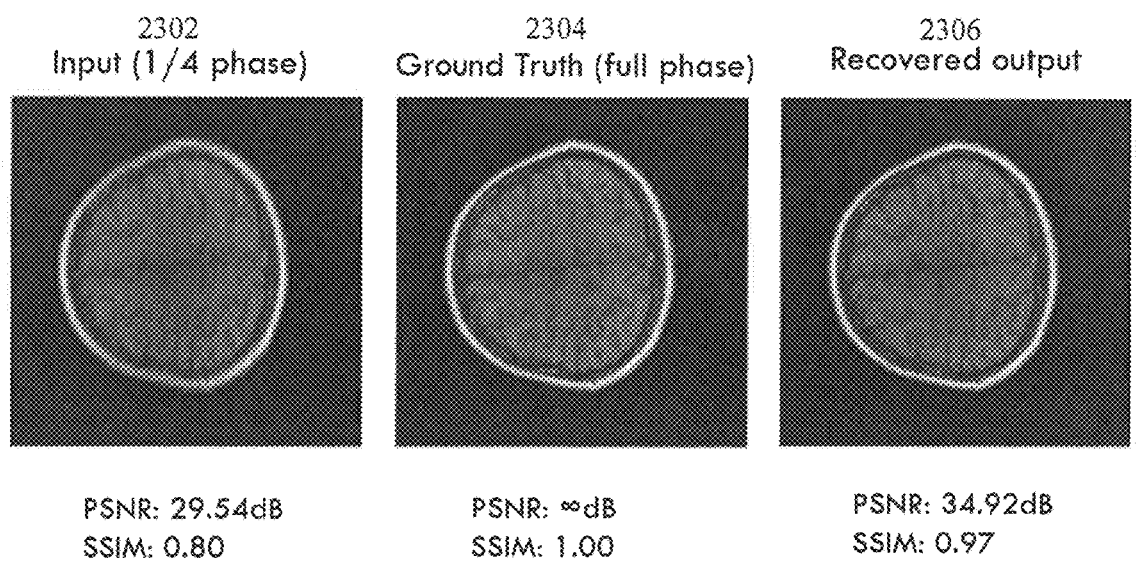
FIG. 23 illustrates exemplary MR fast acquisition results.

In an exemplary embodiment of the present invention, MR fast acquisition may be performed using the image domain H-net method of FIG. 20. In MR fast acquisition, the MR acquisition can take measurements at fewer phases, resulting in a sparse MR image. An enhanced MR image, which attempts to replicate a full phase MR image, is recovered from the sparse MR image using the H-net DNN, Such MR fast acquisition and signal recovery can lead to increased throughput and better patient experience, FIG. 23 illustrates exemplary MR fast acquisition results. As shown in FIG. 23, image 2302 is a sparse MR image resulting from ¼ phase measurements that is input to the H-net DNN, Image 2304 is the corresponding ground truth full phase MR image. Image 2306 is an enhanced MR image recovered from the input sparse MR image 2302. PSNR and SSIM values for each of the images 2302, 2304, and 2306 are also shown in FIG. 23.

Figure 24:
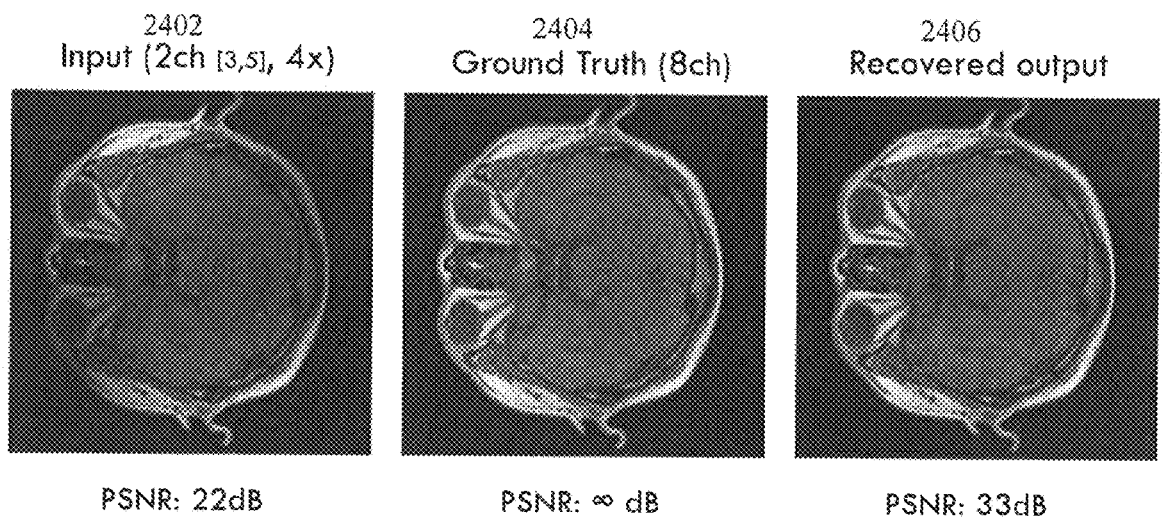
FIG. 24 illustrates exemplary recovery of an 8 channel MR image from a 2-channel MR image acquisition.

In an exemplary embodiment of the present invention, an MR image with a larger number of channels of MR data (e.g., 8 channels) can be recovered from an MR image with a lower number of channels (e.g., 2 channels). This can make high-quality MR imaging more accessible as less expensive MR scanning devices can be used for image acquisition and signal recovery used to generate MR images similar to those resulting from more expensive MR scanning devices. FIG. 24 illustrates exemplary recovery of an 8 channel MR image from a 2-channel MR image acquisition.

As shown in FIG. 24, image 2402 is a 2-channel MR image. Image 2404 is the corresponding ground truth 8-channel MR image. Image 2406 is an enhanced MR image recovered from the input sparse MR image 2402. In an exemplary implementation, four of the 2-channel MR image 2402 are input to the Hornet DNN to generate the enhanced MR image 2406, PSNR values for each of the images 2402, 2404, and 2406 are also shown in FIG. 24.

Figure 25:
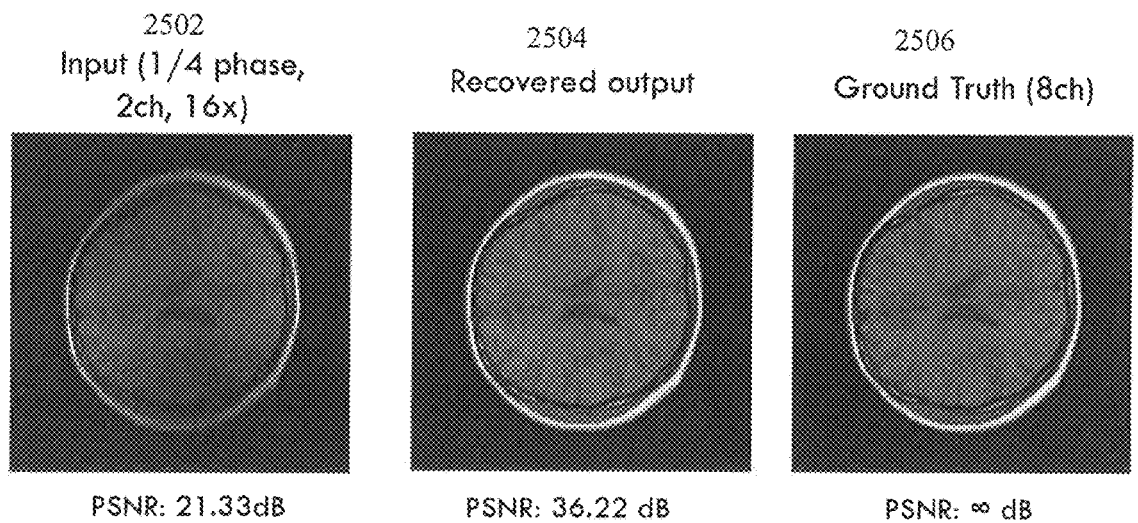
FIG. 25 illustrates exemplary results for combined MR fast acquisition and high-quality MR image recovery.

In an exemplary embodiment of the present invention, MR fast acquisition and recovery of MR images with a high number of channels can be performed together using the image domain H-net method of FIG. 20. FIG. 25 illustrates exemplary results for combined MR fast acquisition and high-quality MR image recovery. As shown in FIG. 25, image 2502 is a 2-channel sparse MR image resulting from ¼ phase measurements that is input to the H-Net DNN. Image 2504 is the recovered output MR image generated by the H-Net. Image 2506 is the corresponding ground truth 8-channel full phase MR image. PSNR values for each of the images 2502, 2504, and 2506 are also shown in FIG. 25.

Figure 26:
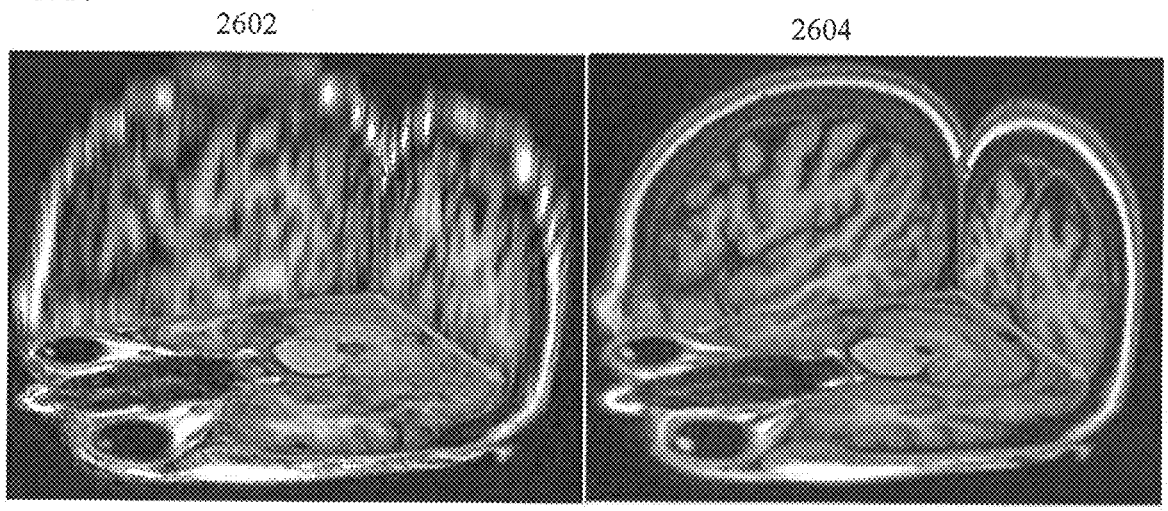
FIG. 26 illustrates exemplary 3D MR slice interpolation results.

In an exemplary embodiment of the present invention, 3D MR slice interpolation can be performed using the image domain H-net method of FIG. 20. In 3D MR slice interpolation, a 3D MR image is input to the H-Net and an interpolated (superresolution) 3D MR volume is generated. FIG. 26 illustrates exemplary 3D MR slice interpolation results. As shown in FIG. 26, image 2602 shows an input 3D MR image and image 2604 shows a recovered interpolated (superresolution) 3D MR volume.

Figure 27:
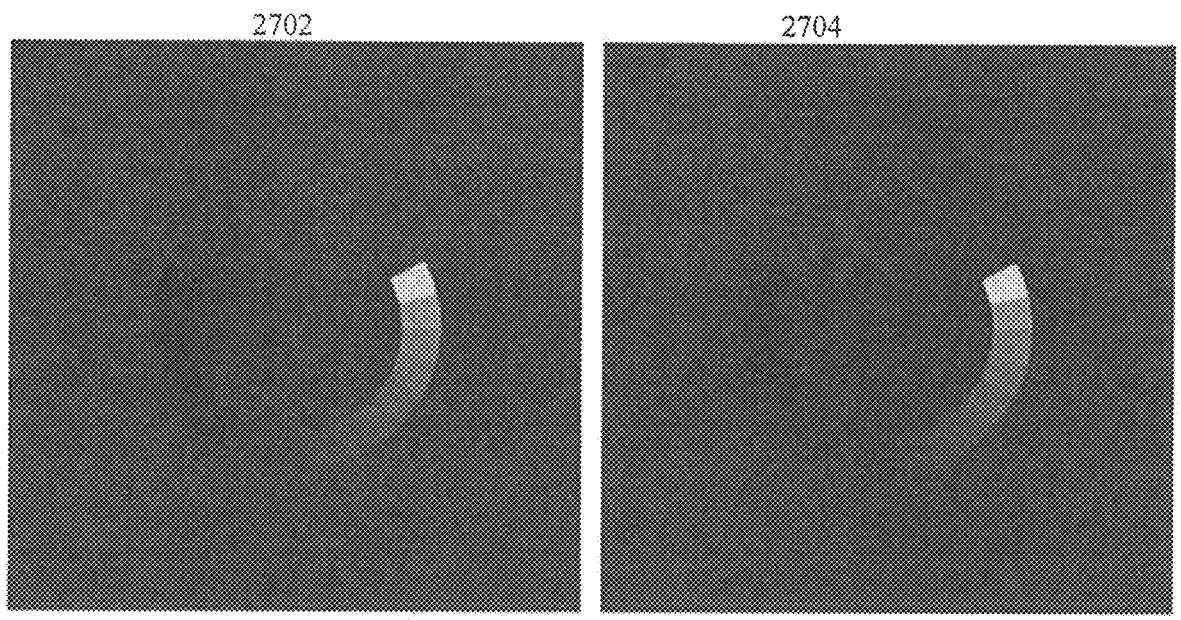
FIG. 27 illustrates exemplary X-ray image denoising results.

In exemplary embodiments of the present invention, x-ray image denoising may be performed by the dual-domain network method of FIG. 11, the image domain H-Net method of FIG. 20, or the sensor signal domain H-Net method of FIG. 21. FIG. 27 illustrates exemplary X-ray image denoising results. The results of FIG. 27 are generated using the image domain H-net method of FIG. 1. As shown in FIG. 27, image 2702 is an input X-ray image and image 2704 is a denoised X-ray image recovered from the input X-ray image 2702.

Figure 28:
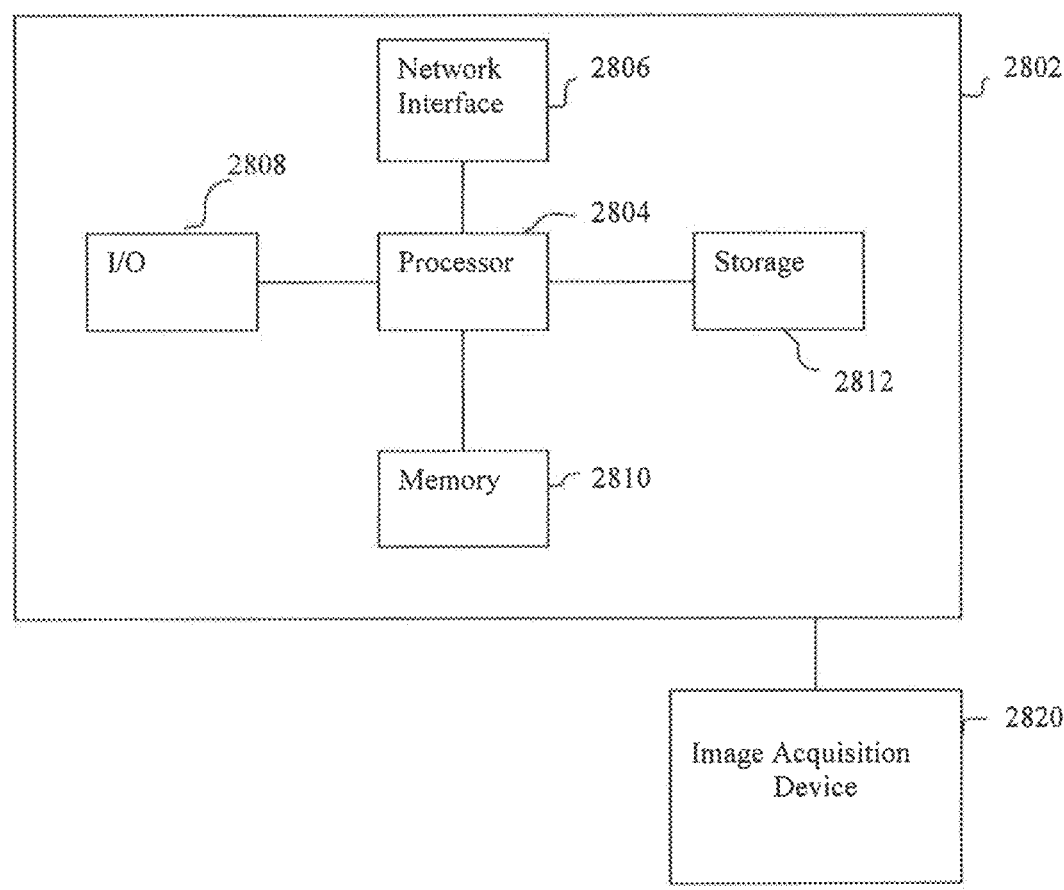
FIG. 28 is a high-level block diagram of a computer capable of implementing embodiments of the present invention.

The above-described methods for automated disease progression modeling and therapy optimization may be implemented on a computer using well-known computer processors, memory units, storage devices, computer software, and other components. A high-level block diagram of such a computer is illustrated in FIG. 28. Computer 2802 contains at least one processor 2804, which controls the overall operation of the computer 2802 by executing computer program instructions which define such operation. The computer program instructions may be stored in a storage device 2812 (e.g., magnetic disk) and loaded into memory 2810 when execution of the computer program instructions is desired. Thus, the steps of the methods of FIGS. 1-6, 10-13, and 20-21 may be defined by the computer program instructions stored in the memory 2810 and/or storage 2812 and controlled by the processor 2804 executing the computer program instructions. An image acquisition device 2820, such as a CT scanning device, MR scanning device, Ultrasound device, etc., can be connected to the computer 2802 to input image data to the computer 2802. It is possible to implement the image acquisition device 2820 and the computer 2802 as one device. It is also possible that the image acquisition device 2820 and the computer 2802 communicate wirelessly through a network. In a possible embodiment, the computer 2802 may be located remotely with respect to the image acquisition device 2820 and the method steps are performed as part of a server or cloud-based service. The computer 2802 also includes one or more network interfaces 2806 for communicating with other devices via a network. The computer 2802 also includes other input/output devices 2808 that enable user interaction with the computer 2802 (e.g., display, keyboard, mouse, speakers, buttons, etc.). One skilled in the art will recognize that an implementation of an actual computer could contain other components as well, and that FIG. 28 is a high-level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for coupled medical image formation and medical image signal recovery using a dual-domain network having a first deep neural network (DNN) to perform signal recovery in a sensor signal domain and a second DNN to perform signal recovery in an image domain, wherein the first DNN and the second DNN of the dual-domain network are trained together end-to-end based on training data to minimize a combined loss function, the method comprising:
   receiving, by a processing device of a device for coupled medical image formation and medical image signal recovery using the dual-domain network, a sensor signal acquired by a sensor of a medical imaging device;
   generating, by the processing device, a refined sensor signal from the received sensor signal using the first DNN;
   generating, by the processing device, a first reconstructed medical image from the received sensor signal, wherein the generating the first reconstructed medical image from the received sensor signal comprises reconstructing the first reconstructed medical image from the received sensor signal using a differentiable reconstruction layer of the dual-domain network;
   generating, by the processing device, a second reconstructed medical image from the refined sensor signal generated by the first DNN, wherein the generating the second reconstructed medical image from the refined sensor signal generated by the first DNN comprises reconstructing the second reconstructed medical image from the refined sensor signal using the differentiable reconstruction layer of the dual-domain network, and wherein the differentiable reconstruction layer of the dual-domain network allows back-propagation of gradients from the second DNN to the first DNN during training;
   generating, by the processing device, an enhanced medical image based on both the first reconstructed medical image and the second reconstructed medical image by the second DNN; and
   providing by the processing device for on a display device, the enhanced medical image generated by the second DNN.

2. The method of claim 1, wherein the received sensor signal and refined sensor signals are fan-beam sinograms, the first and second reconstructed medical images are computed tomography images, and the differentiable reconstruction layer comprises a radon inversion layer that reconstructs a CT image from a fan-beam sinogram by:
- converting the fan-beam sinogram to a parallel-beam sinogram;
- applying Ram-Lak filtering to the parallel-beam sinogram; and
- back-projecting the filtered parallel-beam sinogram to the image domain for each of a plurality of projection angles.

3. The method of claim 1, wherein the received sensor signal is a sinogram received from a CT scanner, and the method further comprises:
- generating a metal trace mask from the received sinogram; and
- performing linear interpolation on the received sinogram, resulting a linearly interpolated sinogram.

4. The method of claim 3, wherein:
- the generating the refined sensor signal from the received sensor signal using the first DNN comprises generating a restored sinogram from the linearly interpolated sonogram and the metal trace mask using the first DNN;
- the generating the first reconstructed medical image from the received sensor signal comprises reconstructing a first reconstructed CT image from the linearly interpolated sinogram using a differentiable radon inversion layer of the dual-domain network;
- the generating the second reconstructed medical image from the refined sensor signal generated by the first DNN comprises reconstructing a second reconstructed CT image from the restored sinogram using the differentiable radon inversion layer of the dual-domain network; and
- the generating the enhanced medical image based on both the first reconstructed medical image and the second reconstructed medical image using the second DNN comprises generating a reduced metal artifact CT image based on the first reconstructed CT image and the second reconstructed CT image using the second DNN.

5. The method of claim 4, wherein the first DNN has a mask pyramid U-Net architecture.

6. The method of claim 4, wherein the combined loss function includes a first DNN loss, a second DNN loss, and a radon consistency loss that penalizes restored sinograms generated by the first DNN that lead to secondary artifacts in the image domain after reconstruction by the radon inversion layer.

7. The method of claim 1, wherein the first DNN and the second DNN are deep image-to-image networks.

8. The method of claim 7, wherein at least one of the first DNN or the second DNN is an H-net deep image-to-image network comprising:
- a first deep image-to-image network trained to generate an enhanced output image from an input image; and
- a second deep image-to-image network trained to generate a coarse resolution enhanced output image from a coarse resolution input image generated by down-sampling the input image;
- wherein a plurality of encoding stages of the first image-to-image network each input feature maps generated by a preceding encoding stage of the first image-to-image network and feature maps generated by the preceding encoding stage of the second image-to-image network, and generate feature maps based on the input feature maps from the preceding stage of the first deep image-to-image network and the preceding stage of the second deep image-to-image network.

9. The method of claim 1, wherein the first DNN and the second DNN are trained to perform at least one of computed tomography (CT)/cone beam computed tomography (CBCT) sparse view reconstruction, full phase magnetic resonance (MR) image recovery from a reduced phase MR acquisition, multi-channel MR image recover from an MR acquisition with fewer channels, 3D MR slice interpolation, or X-ray image denoising.

10. An apparatus for coupled medical image formation and medical image signal recovery, the apparatus comprising:
- a medical image acquisition device sensor to acquire a sensor signal representing anatomy of a subject;
- a memory to store computer program instructions for coupled medical image formation and medical image signal recovery using a dual-domain network having a first deep neural network (DNN) to perform signal recovery in a sensor signal domain and a second DNN to perform signal recovery in an image domain,
- a processor to execute the computer program instructions to:
- generate a refined sensor signal from the received sensor signal using the first DNN;
- generate a first reconstructed medical image from the received sensor signal;
- generate a second reconstructed medical image from the refined sensor signal generated by the first DNN;
- generate an enhanced medical image based on both the first reconstructed medical image and the second reconstructed medical image using the second DNN; and
- provide for display the enhanced medical image generated by the second DNN, wherein the first DNN and the second DNN of the dual-domain network are trained together end-to-end based on training data to minimize a combined loss function, wherein at least one of the first DNN or the second DNN is an H-net deep image-to-image network comprising:
- a first deep image-to-image network trained to generate an enhanced output image from an input image; and
- a second deep image-to-image network trained to generate a coarse resolution enhanced output image from a coarse resolution input image generated by down-sampling the input image, and
- wherein a plurality of encoding stages of the first image-to-image network each input feature maps generated by a preceding encoding stage of the first image-to-image network and feature maps generated by the preceding encoding stage of the second image-to-image network, and generate feature maps based on the input feature maps from the preceding stage of the first deep image-to-image network and the preceding stage of the second deep image-to-image network.

11. The apparatus of claim 10, wherein:
- the first DNN and the second DNN are trained to perform computed tomography (CT) metal artifact reduction and the received sensor signal is a sinogram received from a CT scanner;
- wherein the processing device is further to:
  - generate a metal trace mask from the received sonogram,
  - perform linear interpolation on the received sinogram, resulting a linearly interpolated sinogram;
- wherein to generate a refined sensor signal from the received sensor signal using the first DNN comprises to generate a restored sinogram from the linearly interpolated sonogram and the metal trace mask using the first DNN;

wherein to generate a first reconstructed medical image from the received sensor signal comprises to reconstruct a first reconstructed CT image from the linearly interpolated sinogram using a differentiable radon inversion layer of the dual-domain network;

wherein to generate a second reconstructed medical image from the refined sensor signal generated by the first DNN comprises to reconstruct a second reconstructed CT image from the restored sinogram using the differentiable radon inversion layer of the dual-domain network; and wherein to generate an enhanced medical image based on both the first reconstructed medical image and the second reconstructed medical image using the second DNN comprises to generate a reduced metal artifact CT image based on the first reconstructed CT image and the second reconstructed CT image using the second DNN.

12. A non-transitory computer readable medium storing computer program instructions for coupled medical image formation and medical image signal recovery using a dual-domain network having a first deep neural network (DNN) to perform signal recovery in a sensor signal domain and a second DNN to perform signal recovery in an image domain, wherein the first DNN and second DNN are trained together end-to-end based on training data to minimize a combined loss function, and wherein the first DNN and the second DNN of the dual-domain network are trained to perform computed tomography (CT) metal artifact reduction, the computer program instructions when executed by a processor cause the processor to perform operations comprising:

receiving a sensor signal acquired by a sensor of a medical imaging device, wherein the received sensor signal is a sinogram received from a CT scanner;

generating a refined sensor signal from the received sinogram using the first DNN;

generating a first reconstructed medical image from the received sinogram;

generating a metal trace mask from the received sinogram;

performing linear interpolation on the received sinogram, resulting in a linerarly interpolated sinogram;

generating a second reconstructed medical image from the refined sensor signal generated by the first DNN;

generating an enhanced medical image based on both the first reconstructed medical image and the second reconstructed medical image using the second DNN; and providing for display the enhanced medical image generated by the second DNN.

13. The non-transitory computer readable medium of claim 12, wherein:

the generating the refined sensor signal from the received sensor signal using the first DNN comprises generating a restored sinogram from the linearly interpolated sonogram and the metal trace mask using the first DNN;

the generating the first reconstructed medical image from the received sensor signal comprises reconstructing a first reconstructed CT image from the linearly interpolated sinogram using a differentiable radon inversion layer of the dual-domain network;

the generating the second reconstructed medical image from the refined sensor signal generated by the first DNN comprises reconstructing a second reconstructed CT image from the restored sinogram using the differentiable radon inversion layer of the dual-domain network; and the generating the enhanced medical image based on both the first reconstructed medical image and the second reconstructed medical image using the second DNN comprises generating a reduced metal artifact CT image based on the first reconstructed CT image and the second reconstructed CT image using the second DNN.

14. The non-transitory computer readable medium of claim 12, wherein at least one of the first DNN or the second DNN is an H-net deep image-to-image network comprising:

a first deep image-to-image network trained to generate an enhanced output image from an input image; and a second deep image-to-image network trained to generate a coarse resolution enhanced output image from a coarse resolution input image generated by downsampling the input image;

wherein a plurality of encoding stages of the first image-to-image network each input feature maps generated by a preceding encoding stage of the first image-to-image network and feature maps generated by the preceding encoding stage of the second image-to-image network, and generate feature maps based on the input feature maps from the preceding stage of the first deep image-to-image network and the preceding stage of the second deep image-to-image network.

* * * * *